US012561926B2

(12) United States Patent
Ko et al.

(10) Patent No.: US 12,561,926 B2
(45) Date of Patent: Feb. 24, 2026

(54) ELECTRONIC DEVICE AND METHOD FOR DISPLAYING NOTIFICATION ABOUT EXTERNAL OBJECT

(71) Applicant: Samsung Electronics Co., Ltd., Suwon-si (KR)

(72) Inventors: Taehun Ko, Suwon-si (KR); Donghee Kang, Suwon-si (KR); Myungkyu Kim, Suwon-si (KR); Insik Myung, Suwon-si (KR); Yonghee Cho, Suwon-si (KR); Hoon Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 256 days.

(21) Appl. No.: 18/188,536

(22) Filed: Mar. 23, 2023

(65) Prior Publication Data
US 2023/0230334 A1      Jul. 20, 2023

Related U.S. Application Data

(63) Continuation of application No. PCT/KR2021/011661, filed on Aug. 31, 2021.

(30) Foreign Application Priority Data

Sep. 24, 2020    (KR) ......................... 10-2020-0124151

(51) Int. Cl.
*G06T 19/20* (2011.01)
*G08B 21/18* (2006.01)
(52) U.S. Cl.
CPC ............ *G06T 19/20* (2013.01); *G08B 21/182* (2013.01); *G06T 2200/24* (2013.01); *G06T 2219/2016* (2013.01)

(58) Field of Classification Search
None
See application file for complete search history.

(56) References Cited

U.S. PATENT DOCUMENTS 9,568,735 B2      2/2017   Park et al.
9,836,652 B2     12/2017   Lection et al.
(Continued)

FOREIGN PATENT DOCUMENTS

JP      2010145436 A      7/2010
JP      2012155655 A      8/2012
(Continued)

OTHER PUBLICATIONS

Korean Office Action Issued In KR Application No. 10-2020-0124151; Mail Date Mar. 26, 2025; 13 Pages.

*Primary Examiner* — Kyle Zhai
(74) *Attorney, Agent, or Firm* — CANTOR COLBURN LLP

(57) ABSTRACT

An electronic having a sensor, a display including a first area and a second area, and a processor electrically connected to the sensor and the display. The processor acquires information on an external object through the sensor, determines the importance of the external object through the information, and controls the display to display at least one augmented reality object or at least one virtual reality object in the first area in response to at least one of determining that the importance is less than a first importance and that the information on the external object has not been acquired. The processor also controls the display to display an indicator in the second area so that the indicator has a first size and removes at least a part of the at least one augmented reality object or the at least one virtual reality object according to priorities.

18 Claims, 20 Drawing Sheets

(56) References Cited

U.S. PATENT DOCUMENTS

| | | | |
|---|---|---|---|
| 10,502,955 B2 | 12/2019 | Kimura et al. | |
| 10,606,075 B2 | 3/2020 | Choi et al. | |
| 10,748,425 B2 | 8/2020 | Takemori et al. | |
| 2011/0234619 A1 | 9/2011 | Tokunaga | |
| 2012/0194554 A1 | 8/2012 | Kaino et al. | |
| 2014/0300466 A1* | 10/2014 | Park | G08B 19/00 |
| | | | 340/539.11 |
| 2015/0094142 A1 | 4/2015 | Stafford | |
| 2016/0282618 A1 | 9/2016 | Kon et al. | |
| 2017/0076606 A1 | 3/2017 | Gupta et al. | |
| 2018/0301122 A1* | 10/2018 | Katsuyama | B60R 1/04 |
| 2018/0330531 A1* | 11/2018 | Mullins | G06T 19/006 |
| 2019/0130604 A1* | 5/2019 | Seaton | G06T 19/00 |
| 2020/0258278 A1 | 8/2020 | Mirhosseini et al. | |
| 2020/0330866 A1* | 10/2020 | Yang | A63F 13/2145 |
| 2020/0361482 A1* | 11/2020 | Choi | B60W 10/04 |
| 2021/0097866 A1* | 4/2021 | Leary | G08G 1/205 |
| 2022/0348217 A1 | 11/2022 | Jeong et al. | |

FOREIGN PATENT DOCUMENTS

| | | | |
|---|---|---|---|
| JP | 2014181927 A | 9/2014 | |
| JP | 2015118332 A | 6/2015 | |
| JP | 2016541035 A | 12/2016 | |
| JP | 6372402 B2 | 8/2018 | |
| JP | 6855350 B2 | 4/2021 | |
| KR | 101518115 B1 | 5/2015 | |
| KR | 20150078920 A | 7/2015 | |
| KR | 20160070529 A | 6/2016 | |
| KR | 20180054285 A | 5/2018 | |
| KR | 20180095324 A | 8/2018 | |
| KR | 101899981 B1 | 9/2018 | |
| KR | 20190056132 A | 5/2019 | |
| KR | 20190063000 A | 6/2019 | |
| KR | 20190094673 A | 8/2019 | |
| KR | 102023601 B1 | 9/2019 | |
| KR | 20190126258 A | 11/2019 | |
| KR | 102054712 B1 | 1/2020 | |
| KR | 20200044102 A | 4/2020 | |

* cited by examiner

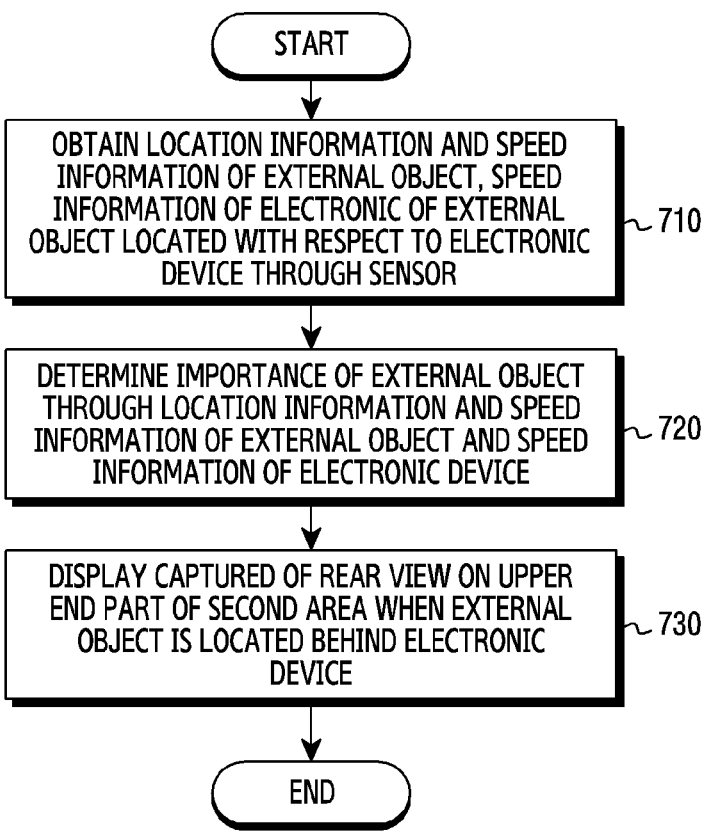

START

OBTAIN LOCATION INFORMATION AND SPEED
INFORMATION OF EXTERNAL OBJECT, SPEED
INFORMATION OF ELECTRONIC OF EXTERNAL
OBJECT LOCATED WITH RESPECT TO ELECTRONIC
DEVICE THROUGH SENSOR ~710

DETERMINE IMPORTANCE OF EXTERNAL OBJECT
THROUGH LOCATION INFORMATION AND SPEED
INFORMATION OF EXTERNAL OBJECT AND SPEED
INFORMATION OF ELECTRONIC DEVICE ~720

DISPLAY CAPTURED OF REAR VIEW ON UPPER
END PART OF SECOND AREA WHEN EXTERNAL
OBJECT IS LOCATED BEHIND ELECTRONIC
DEVICE ~730

END

ELECTRONIC DEVICE AND METHOD FOR DISPLAYING NOTIFICATION ABOUT EXTERNAL OBJECT

CROSS-REFERENCE TO RELATED APPLICATIONS

This application is a continuation application of International Application No. PCT/KR2021/011661 designating the United States, filed on Aug. 31, 2021, in the Korean Intellectual Property Receiving Office and claiming priority to Korean Patent Application No. 10-2020-0124151, filed on Sep. 24, 2020, in the Korean Intellectual Property Office, the disclosures of which are incorporated by reference herein in their entireties.

TECHNICAL FIELD

The disclosure relates to a display technology according to external object recognition by an electronic device.

BACKGROUND

Augmented reality (AR) refers to a technology that synthesizes virtual objects or information in a real environment to make them look like objects existing in the original environment. Virtual reality (VR) refers to a technology that artificially creates, by using electronic devices such as computers, a virtual environment that is similar to a real environment but does not actually exist.

Augmented reality (AR) and virtual reality (VR) may be typically implemented through a head-mounted display (HMD). The HMD is a display device that may be mounted on the user's head to present an image directly in front of the user's eyes.

When a user wearing an HMD device is active outdoors or indoors, the user's awareness of an external object may decrease because the user may concentrate on an augmented reality object or virtual reality object displayed on a display. For example, when there is a dangerous object rapidly approaching the user wearing the HMD device, the user using the augmented reality technology may not recognize the dangerous object and an accident may occur.

SUMMARY

An electronic device according to an embodiment herein may include a sensor, a display including a first area and a second area, and at least one processor which is configured to be electrically connected to the sensor and the display, obtain information on an external object through the sensor, determine the importance of the external object through the information, control the display to display at least one augmented reality object or at least one virtual reality object in the first area in response to at least one of determining that the importance is less than a first importance and determining that the information on the external object has not been obtained, control the display to display an indicator in the second area to be a first size in response to the importance which is equal to or greater than the first importance and is less than a second importance, and in response to the importance which is equal to or greater than the second importance, display the indicator in a second size greater than the first size and remove at least a part of the at least one augmented reality object or the at least one virtual reality object according to priority.

A method for operating an electronic device according to an embodiment herein may include acquiring information on an external object through a sensor, determining the importance of the external object through the information, displaying at least one augmented reality object or at least one virtual reality object in a first area of a display in response to at least one of determining that the importance is less than a first importance and that the information on the external object has not been obtained, displaying an indicator in a second area of the display to be a first size in response to the importance which is equal to or greater than the first importance and less than a second importance, and in response to the importance which is equal to or greater than the second importance, displaying the indicator in a second size larger than the first size on the display and removing at least a part of the at least one augmented reality object or the at least one virtual reality object according to priority.

According to various embodiments disclosed herein, an electronic device may improve user's awareness of an external object by visually displaying information on a surrounding environment. In particular, the user may intuitively recognize dangerous objects located nearby, thereby preventing accidents in advance and securing the user's safety.

An electronic device according to the disclosure may help a user recognize reality by changing content displayed on a display according to the importance of an external object. In addition, the electronic device according to the disclosure may help a user to recognize an external object approaching from the front or rear and even on a plurality of external objects. Furthermore, the electronic device may display different screens on the display in various situations, thereby enabling a user to use augmented reality or virtual reality technology efficiently.

The effects obtainable in the disclosure are not limited to the effects mentioned above, and other effects not mentioned above may be clearly understood by those skilled in the art to which the disclosure belongs, from the description below.

BRIEF DESCRIPTION OF DRAWINGS

FIG. 7 is a flowchart illustrating a method for displaying an image on a display when an external object is located behind an electronic device according to an embodiment.

DETAILED DESCRIPTION

According to various embodiments, an electronic device of the disclosure is a wearable electronic device and may include a head-mounted display (HMD) device (e.g., smart glasses) mounted on a user's head and moving according to the movement of the head.

Figure 1A:
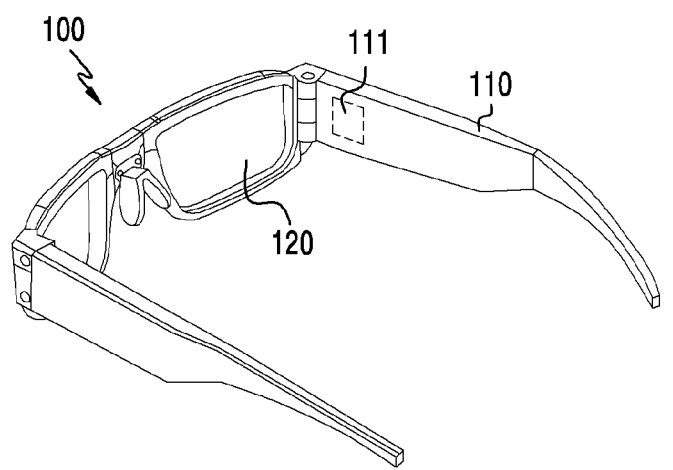
FIG. 1A illustrates an electronic device according to an embodiment.

FIG. 1A illustrates an electronic device according to an embodiment.

According to an embodiment, the electronic device 100, which is smart glasses in the form of eyeglasses, may include a temple 110 and a lens 120.

In an embodiment, the temple 110 of the electronic device 100 may include a projector 111 and a prism (not shown). In an embodiment, the projector 111 may emit a beam containing data toward the prism (not shown), and the beam refracted from the prism may be displayed on the lens 120.

In an embodiment, the projector 111 may display an image through a processor. In an embodiment, a user wearing the electronic device 100 may identify, through the lens 120, the real environment together with data information emitted by the projector 111. Through this, the electronic device 100 may implement augmented reality (AR) for a real environment.

Figure 1B:
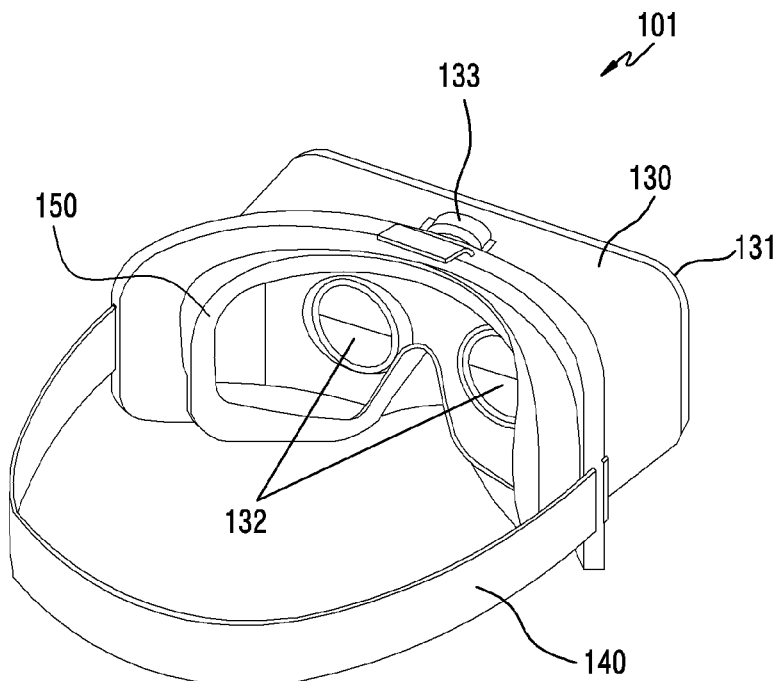
FIG. 1B illustrates an electronic device according to an embodiment.

FIG. 1B illustrates an electronic device according to an embodiment.

According to an embodiment, the electronic device 101 may include a main frame 130, a wearing part 140 connected to the main frame 130 to be fixed to a part of the body (e.g., the head), and a face foam 150 in contact with the face.

According to an embodiment, the main frame 130 may be worn on at least a part of the user's face, and may be supported on the user's face by various components. In an embodiment, the wearing part 140 may enable the main frame 130 to be in tight contact around the eyes of the user's face by adjusting the length of a band formed of an elastic material, and the band may have cushions attached to provide a comfortable fit in consideration of long-time wearing.

In an embodiment, the rear surface of the main frame 130, which is a part in contact with the user's face, may have a structure corresponding to the curvature of the user's face, and may include an at least partially elastic body. In an embodiment, the elastic body may employ at least one cushioning material (e.g., sponge) to provide a comfortable fit when the face foam 150 is in contact with the user's face.

In an embodiment, the main frame 130 may include a display 131 on the front surface thereof. In an embodiment, a lens part 132 may be disposed on the main frame 130, and a user may see an image displayed on the display 131 through the lens part 132. In an embodiment, the display 131 may display different images on the left and right lenses of the lens part 132, respectively. For example, in the display 131, the display 131 viewed through the left lens of the lens part 132 may display a left eye image to be transmitted to the user's left eye, and the display 131 viewed through the right lens of the lens part 132 may display a right eye image to be transmitted to the user's right eye. The display 131 may display different left eye images and right eye images, so that the user may feel a three-dimensional (3D) effect. Through this, the electronic device 101 may implement virtual reality (VR) or augmented reality (AR) in a virtual 3D space.

In an embodiment, the electronic device 101 may provide a clear image displayed on the display 131 to the user by adjusting a focus adjustment part 133. In an embodiment, the focus adjustment part 133 may be configured in the form of a wheel or a dial.

Figure 1C:
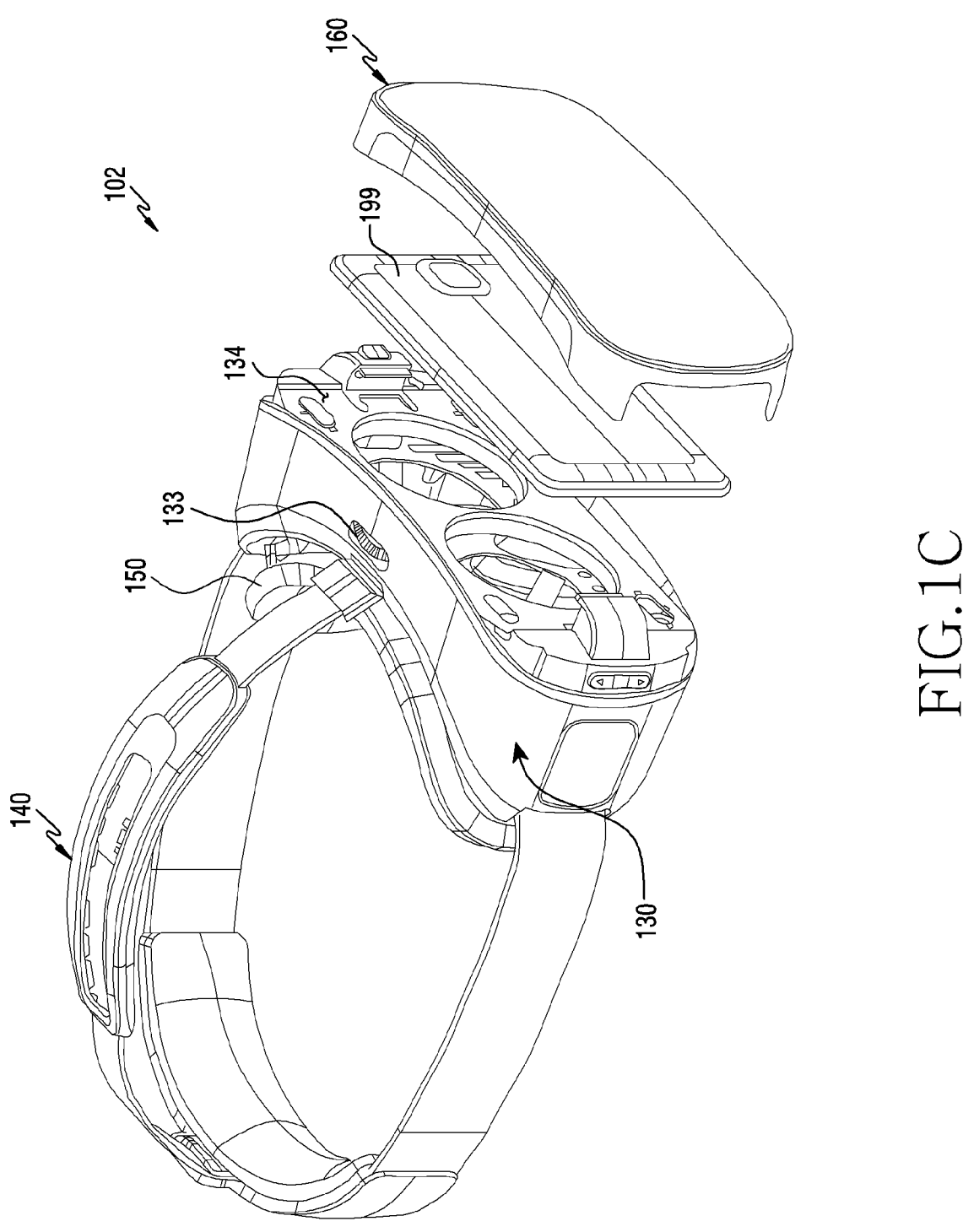
FIG. 1C illustrates an electronic device according to an embodiment.

FIG. 1C illustrates an electronic device according to an embodiment.

Referring to FIG. 1C, the electronic device 102 may be a wearable electronic device enabling an external electronic device 199 to be coupled thereto.

In an embodiment, the main frame 130 may be made of a material (e.g., plastic) that is light enough for a user to feel comfortable wearing and capable of supporting the external electronic device 199. In an embodiment, a seating part 134 including a space or structure enabling the external electronic device 199 to be coupled thereto may be formed on the front surface of the main frame 130. The seating part 134 of the main frame 130 may correspond to the outer shape of the external electronic device 199.

In an embodiment, the electronic device 102 may include a cover 160 coupled to more firmly support a terminal of the external electronic device 199 to the main frame 130 in a state in which the terminal is fastened to the main frame 130. In an embodiment, the cover 160 may be physically coupled (e.g., a hook) to the main frame 130 or coupled thereto by using a magnet or an electromagnet.

Figure 2:
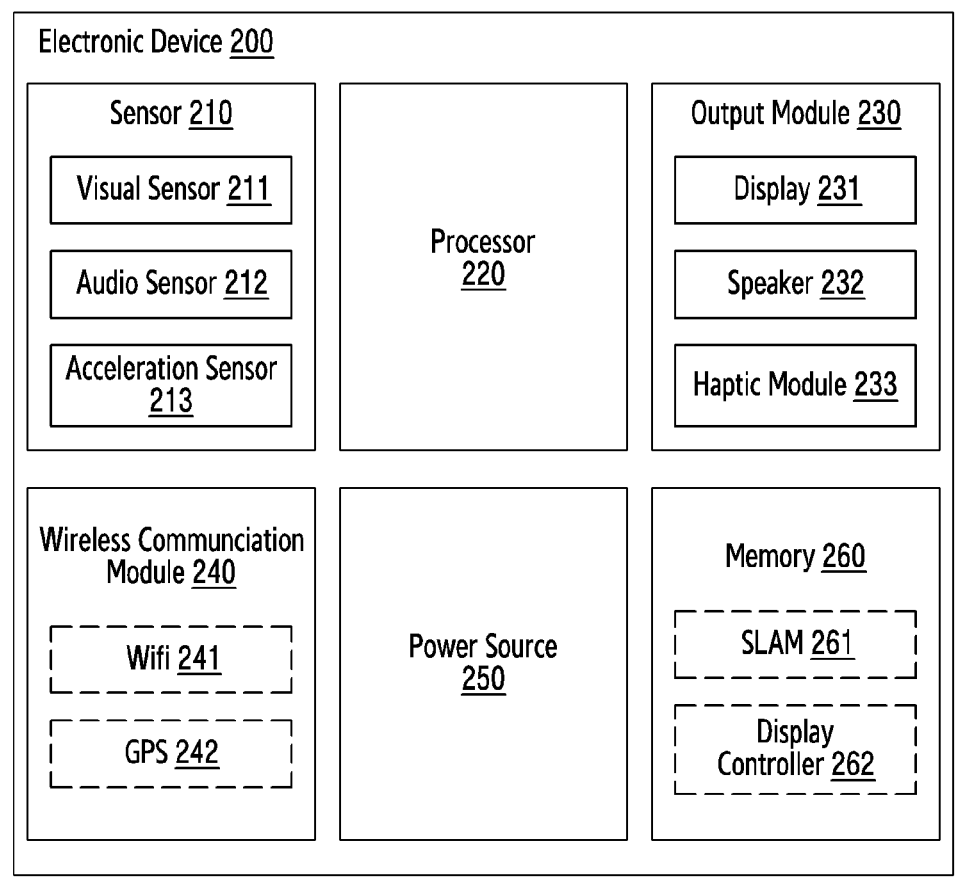
FIG. 2 is a block diagram of an electronic device according to an embodiment.

FIG. 2 is a block diagram of an electronic device 200 according to an embodiment.

Referring to FIG. 2, the electronic device 200 may include a sensor 210, a processor 220, an output module 230, a wireless communication module 240, a power source 250, and a memory 260. In this document, the term "module" may be understood as including hardware or circuitry for performing a predetermined function.

According to an embodiment, the electronic device 200 of FIG. 2 may correspond to the electronic device 100, the electronic device 101, or the electronic device 102 mentioned in FIGS. 1A to 1C. In an embodiment, when the electronic device 200 is referred to as the electronic device 100 mentioned in FIG. 1A, a display 231 may be understood as the lens 120 of the electronic device 100. In an embodiment, when the electronic device 200 is referred to as the electronic device 101 mentioned in FIG. 1B, the display 231 may be understood as display 131 located in front of the main frame 130 of the electronic device 101. In an embodiment, when the electronic device 200 is referred to as the electronic device 102 mentioned in FIG. 1C, the display 231 may be understood as a display of the external electronic device 199.

According to an embodiment, the sensor 210 may include a visual sensor 211, an audio sensor 212, and an acceleration sensor 213.

According to an embodiment, the visual sensor 211 may include a camera, time of flight (TOF), and lidar. The visual sensor 211 may be located in the front and rear of the electronic device 200. The visual sensor 211 may capture still images and moving images of the surrounding environment that changes according to the movement of the electronic device 200. Through the visual sensor 211, the processor 220 may recognize the space of the surrounding environment and recognize a change in plane to measure the location of an external object and the distance to the electronic device 200 from the external object, with respect to the electronic device 200.

According to an embodiment, the audio sensor 212 may include a microphone. The audio sensor 212 may measure a level of a surrounding audio, and the processor 220 may use audio data to measure the location of an external object and the moving direction of the external object. For example, the processor 220 may analyze the time difference of audio data input through the audio sensor 212 to detect the location and direction of the external object and may detect whether the external object is approaching, through a change in the intensity of the audio data.

According to an embodiment, the acceleration sensor 213 may measure a change in speed or momentum of the electronic device 200. For example, the processor 220 may calculate the relative location and relative speed of the external object with respect to the electronic device 200 by using the location information and speed information of the external object acquired through the visual sensor 211 and the audio sensor 212 and the moving speed information of the electronic device 200 acquired through the acceleration sensor 213.

According to an embodiment, the processor 220 may be understood as including at least one processor. For example, the processor 220 may include at least one of an application processor (AP), an image signal processor (ISP), and a communication processor (CP).

According to an embodiment, the processor 220 may determine the importance of an external object by using information acquired through the sensor. The processor 220 may display different screens on the display 231 according to the importance.

According to an embodiment, the output module 230 may include a display 231, a speaker 232, and a haptic module 233.

According to an embodiment, the display 231 may display an image in a display area including a first area and a second area. The first area may be a central area including the center of the display area where a screen is displayed by the display 231, and the second area may correspond to a peripheral area of the display area surrounding the first area. The processor 220 may control the display 231 to display different objects in the first area and the second area. For example, the processor 220 may control the display 231 to display at least one augmented reality object or at least one virtual reality object in the first area, and control the display 231 to display an indicator in the second area.

According to an embodiment, the first area and the second area of the display 231 may not be physically separated. A boundary dividing the first area and the second area may not be visually displayed. The area of the first area and the area of the second area may be adjusted by the user's configuration.

According to an embodiment, the speaker 232 may output sound and the haptic module 233 may output vibration. For example, when the processor 220 determines that the importance of the external object is equal to or greater than a first importance, the processor 220 may output an additional notification through at least one of the speaker 232 and the haptic module 233. In an embodiment, when the processor 220 determines that the importance of the external object is equal to or greater than a second importance, the processor 220 may output a warning sound through the speaker 232 while displaying an indicator on the display 231, or output vibration through the haptic module 233. A user's perception of an external object may be further improved through an additional notification through at least one of the speaker 232 and the haptic module 233.

According to an embodiment, the wireless communication module 240 may include WiFi 241 and/or GPS 242. In an embodiment, the electronic device 200 may access a wireless network through the WiFi 241 and exchange data with an external electronic device (e.g., a smartphone). For example, profile information of an external device may be acquired by receiving user's SNS information. In an embodiment, the electronic device 200 may calculate the location of the electronic device 200 through the GPS 242.

According to an embodiment, the power source 250 may operate the electronic device 200 by supplying power to the electronic device 200. The power source 250 may be a rechargeable secondary battery.

According to an embodiment, the memory 260 may include a SLAM 261 and a display controller 262. In an embodiment, the SLAM 261 may recognize the surrounding environment of the electronic device 200, establish a map of a space, and identify the location of the electronic device 200 within the space. In an embodiment, the display controller 262 may generate a video signal to be displayed on the display 231.

Figure 3:
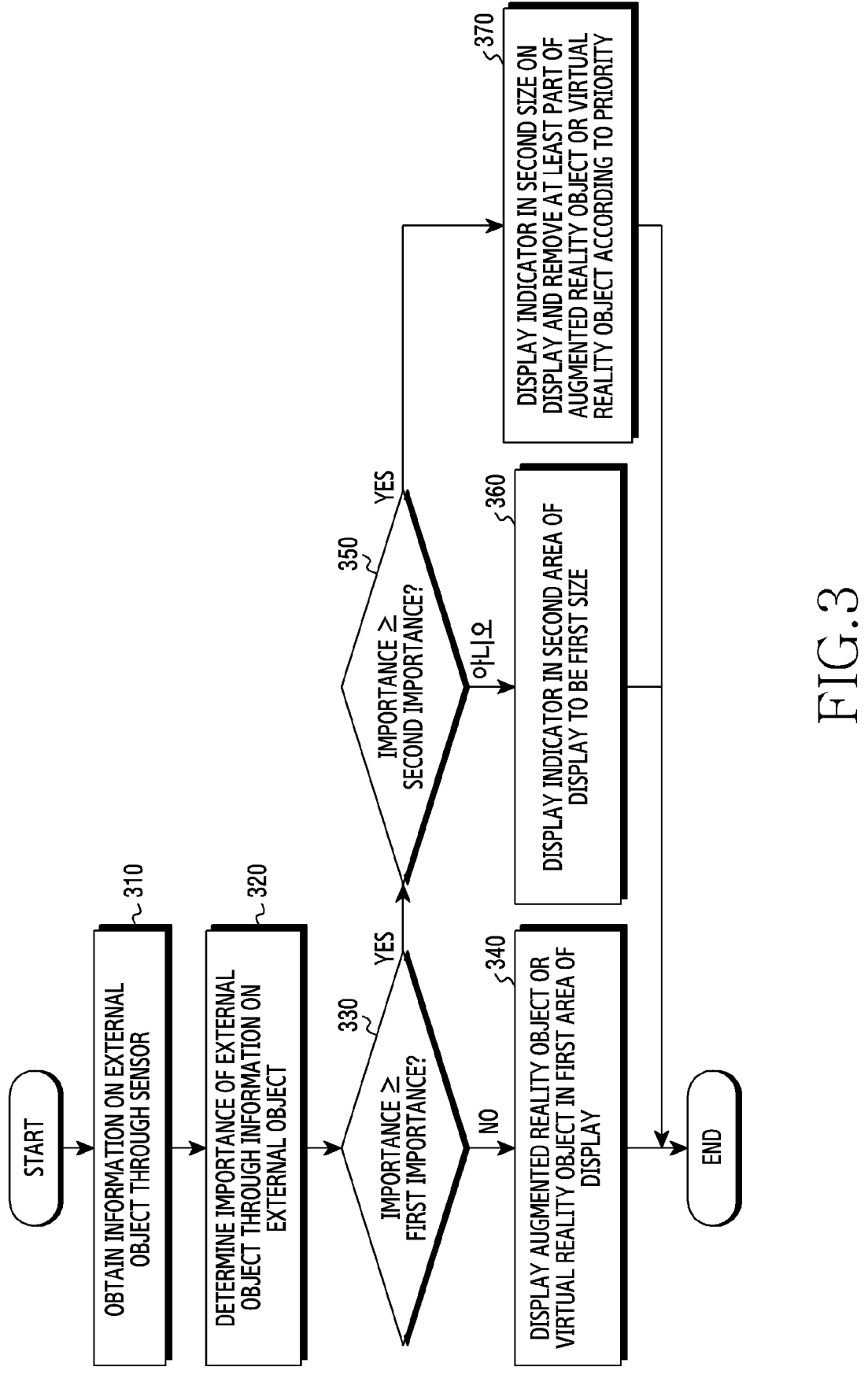
FIG. 3 is a flow chart illustrating a method for displaying information related to an external object on a display according to an embodiment.

FIG. 3 is a flowchart illustrating a method for displaying information related to an external object on the display 231 according to an embodiment. The method described in FIG. 3 may be executed by the electronic device 200 or the processor 220 shown in FIG. 2.

According to an embodiment, in operation 310, the processor 220 may obtain information on an external object through the sensor 210. The sensor 210 may include a visual sensor 211, an audio sensor 212, and an acceleration sensor 213.

According to an embodiment, the processor 220 may obtain location information and speed information of an external object through the visual sensor 211 and the audio sensor 212 and may obtain speed information of the electronic device 200 through the acceleration sensor 213.

According to an embodiment, the processor 220 may obtain relative direction information on an external object located with respect to the electronic device 200 through the sensor 210.

According to an embodiment, the processor 220 may obtain information on a quantity value of an external object through the sensor 210.

According to an embodiment, the processor 220 may also obtain user preference information of an external object or profile information of an external device.

According to an embodiment, in operation 320, the processor 220 may determine the importance of an external object by using the information on an external object.

According to an embodiment, the processor 220 may obtain the relative location and relative speed of an external object with respect to the electronic device 200 by using at least a part of location information of the external object, speed information of the external object, and speed information of the electronic device 200. The processor 220 may determine the importance of the external object by using at least one information of the relative location and relative speed of the external object.

According to an embodiment, the importance of an external object may be classified based on a first importance and a second importance. For example, when an external object is approaching at a relative speed of 3 km/h from a location 8 m away from the electronic device 200, the processor 220 may determine that the importance of the external object is less than the first importance. For another example, when an external object is approaching at a relative speed of 5 km/h from a location 4 m away from the electronic device 200, the processor 220 may determine that the importance of the external object is equal to or greater than the first importance and less than the second importance. For another example, when an external object is approaching at a relative speed of 10 km/h from a location 1 m away from the electronic device 200, the processor 220 may determine that the importance of the external object is equal to or greater than the second importance. However, the above examples are just an example, and various embodiments that may be implemented by those skilled in the art are possible.

According to an embodiment, in operation 330, the processor 220 may determine whether the importance of the external object is equal to or greater than the first importance.

According to an embodiment, in operation 340, the processor 220 may control the display 231 to display at least one augmented reality object or at least one virtual reality object in the first area in response to the importance of the external object which is less than the first importance. The processor 220 may control the display 231 to display at least one augmented reality object or at least one virtual reality object in the first area even when information on an external object is not obtained. At this time, the processor 220 may control the display 231 not to display the augmented reality object or the virtual reality object in the second area.

According to an embodiment, the types of augmented reality objects or virtual reality objects that may be displayed in the first area of the display 231 may vary. For example, when a navigation application is executed by the electronic device 200, the processor 220 may control the display 231 to display at least one augmented reality object including destination information, movement direction information, time information indicating an arrival time, and information on nearby shops in the first area.

According to an embodiment, in operation 350, the processor 220 may determine whether the importance of the external object equal to or greater than the first importance is equal to or greater than the second importance.

According to an embodiment, in operation 360, the processor 220 may control the display 231 to display an indicator in the second area to be a first size in response to the importance of the external object which is equal to or greater than the first importance and less than the second importance.

According to an embodiment, the processor 220 may control the display 231 to display an indicator displayed in the second area in a direction corresponding to the direction of the external object. The processor 220 may display an indicator in various colors and brightnesses on the display 231.

According to an embodiment, the display 231 may be controlled to continuously display at least one augmented reality object or at least one virtual reality object in the first area while displaying the indicator in the second area to be the first size.

According to an embodiment, in operation 370, the processor 220 may control the display 231 such that, in response to the importance of the external object which is equal to or greater than the second importance, the indicator is displayed in a second size larger than the first size and at least a part of at least one augmented reality object or at least one virtual reality object being displayed in the first area is removed according to priority.

According to an embodiment, the processor 220 may control the display 231 such that at least a part of the indicator displayed in the second size is displayed in at least a part of the first area. Accordingly, the processor 220 may control the display 231 to display an indicator in the second size over at least a part of the first area and at least a part of the second area.

According to an embodiment, the processor 220 may control the display 231 such that the indicator is translucently displayed while overlapping at least one augmented reality object or at least one virtual reality object displayed in the first area.

According to an embodiment, when the importance of the external object is equal to or greater than the second importance, the processor 220 may control the display 231 to remove at least a part of at least one augmented reality object or at least a part of at least one virtual reality object from the first area according to priority. When the size of an indicator provided through the display 231 increases and the number of augmented reality objects or virtual reality objects decreases, a user may focus on the surrounding environment and avoid the external object.

According to an embodiment, the priority of at least one augmented reality object or at least one virtual reality object may be a priority configured in advance in an application providing augmented reality or virtual reality objects or a priority configured by a user.

According to an embodiment, the processor 220 may control the display 231 such that as the importance of an external object becomes greater than the second importance, more of at least one augmented reality object or at least one virtual reality object being displayed in the first area is removed. Details will be described later with reference to FIG. 4.

Figure 4:
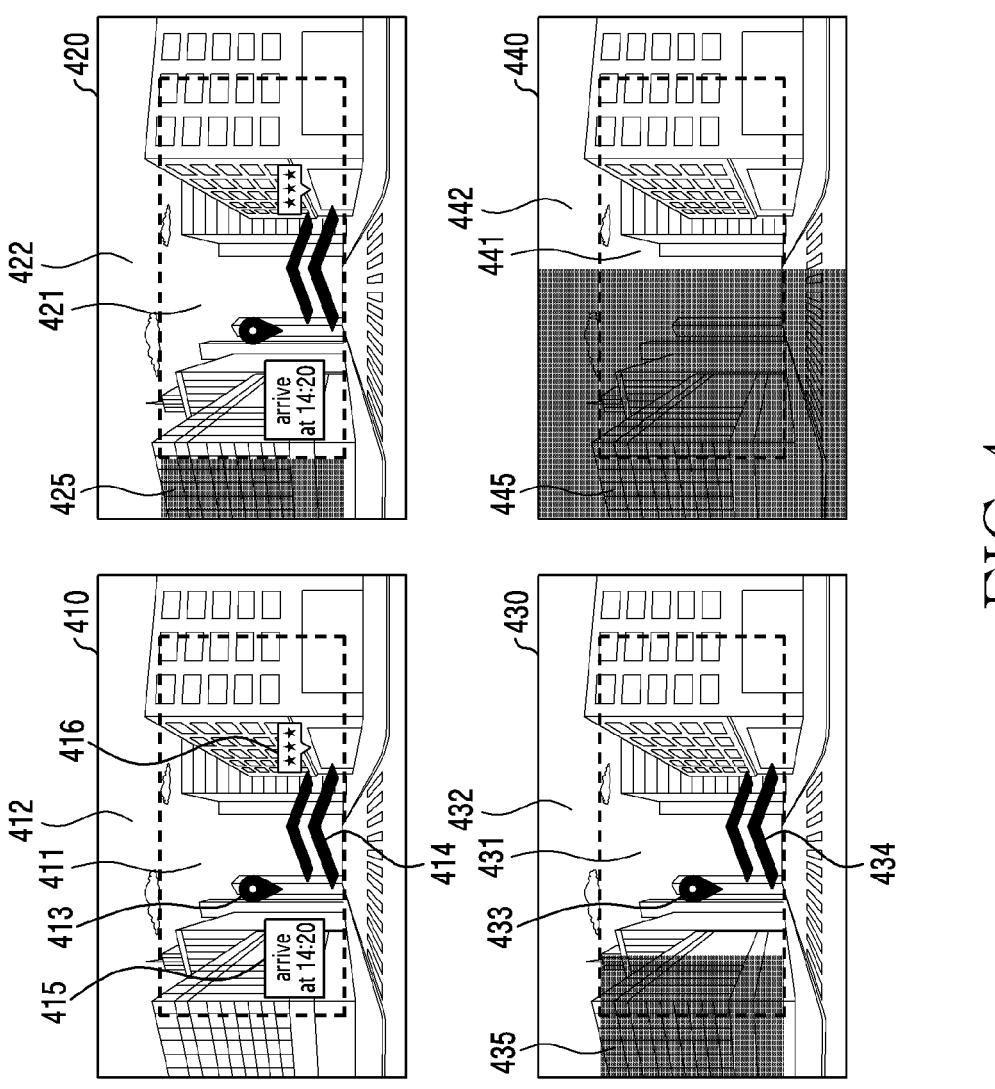
FIG. 4 illustrates examples of screens displayed on a display according to the importance of an external object according to an embodiment.

FIG. 4 illustrates examples of screens displayed on the display 231 according to the importance of an external object according to an embodiment.

Among the screens shown in FIG. 4, the augmented reality objects 413, 414, 415, and 416 and the indicators 425, 435, and 445 may be screens displayed on the display 231 by the processor 220, and other backgrounds (e.g.: buildings, roads, etc.) may represent an actual scene beyond the display 231. While a user sees the actual scene through the transparent or translucent display 231, the user may be provided with at least a part of the augmented reality objects 413, 414, 415, and 416 or indicators 425, 435, and 445 displayed on the display 231.

According to an embodiment, reference number 410 is an example of a screen displayed on the display 231 when the importance of an external object is less than the first importance or information on the external object is not obtained. At this time, the screen displayed on the display 231 may include a first area 411 and a second area 412.

According to an embodiment, the first area 411 may be a central area including the center of the display area where a screen is displayed, and the second area 412 may be a peripheral area of the display area surrounding the first area 411.

According to an embodiment, when the importance of an external object is less than the first importance, the processor 220 may control the display 231 to display an augmented reality object in the first area 411. For example, the processor 220 may control the display 231 to display augmented reality objects including destination information 413, movement direction information 414, time information indicating an arrival time 415, and information on nearby shops 416 in the first area 411.

According to an embodiment, when the importance of the external object is less than the first importance, the processor 220 may control the display 231 not to display the augmented reality object in the second area 412.

According to an embodiment, reference number 420 is an example of a screen displayed on the display 231 when the importance of an external object is equal to or greater than the first importance and less than the second importance.

According to an embodiment, the processor 220 may control the display 231 such that the same number of augmented reality objects as in the reference number 410 is displayed in the first area 421. According to another embodiment, the processor 220 may control the display 231 to display an image which does not include some of the augmented reality objects included in the image 420.

According to an embodiment, the processor 220 may control the display 231 to display the indicator 425 in at least a part of the second area 422 to be the first size.

According to an embodiment, when an external object is located on the user's left side, the processor 220 may control the display 231 to display the indicator 425 on the left side in the second area 422.

According to an embodiment, the color and brightness of the indicator 425 displayed on the display 231 may vary. For example, the indicator 425 may be in the form of a translucent red box.

According to an embodiment, reference number 430 is an example of a screen displayed on the display 231 when the importance of an external object is equal to or greater than the second importance.

According to an embodiment, the processor 220 may control the display 231 such that the indicator 435 displayed in the second size on the display 231 is displayed over at least a part of the second area 432 and at least a part of the first area 431. When the importance of an external object is equal to or greater than the second importance, the processor 220 may display the indicator 435 in the second size greater than the first size and control the display 231 to display at least a part of the indicator 435 in at least a part of the first area 431.

According to an embodiment, the processor 220 may control the display 231 such that at least some of the plurality of augmented reality objects being displayed in the first area 421 are removed according to priority, thereby displaying augmented reality objects as shown in reference number 431. For example, the processor 220 may control the display 231 such that the augmented reality object including the destination information 433 and the movement direction information 434 is continuously displayed in the first area 431 and the augmented reality object including the time information indicating an arrival time 415 and information on nearby shops 416 is removed due to the low priority thereof.

According to an embodiment, reference number 440 is an example of a screen displayed on the display 231 when the importance of an external object is greater than that of reference number 430. For example, the processor 220 may determine that a bicycle approaching at a speed of 30 km/h from a location 5 m away from the electronic device 200 has the importance which is equal to or greater than the second importance. In this case, when the bicycle approaches at a speed of 50 km/h from a location 1 m away from the electronic device 200, the processor 220 may determine that the importance of the bicycle has increased.

According to an embodiment, when the importance of the external object increases continuously, the processor 220 may control the display 231 to display the indicator 445 in the larger size and may sequentially remove the augmented reality object from the first area 431. When the importance of the external object increases significantly, the processor 220 may control the display 231 to remove all the augmented reality objects from the first area 441.

Figure 5:
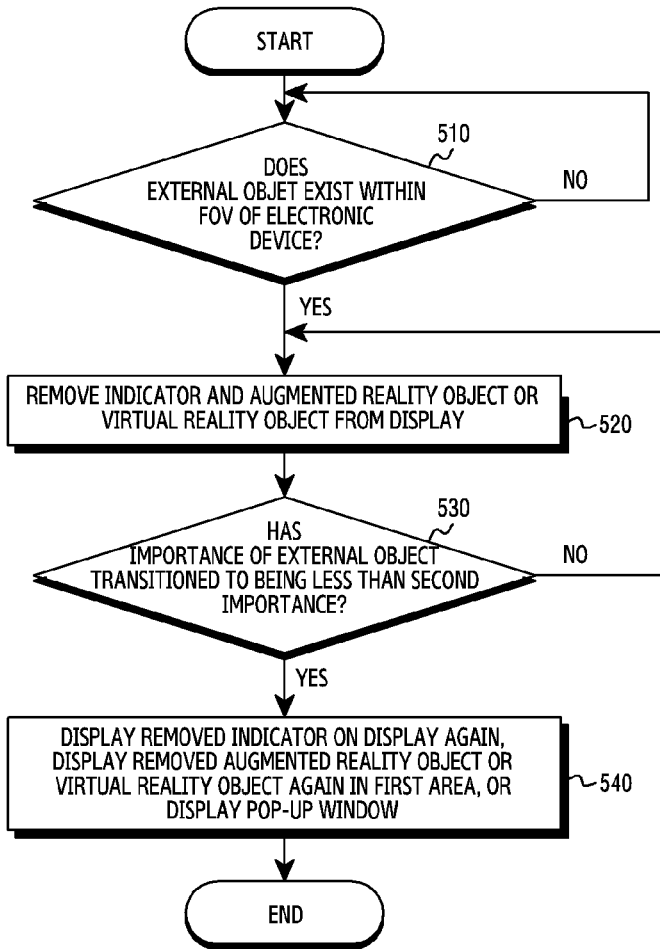
FIG. 5 is a flowchart illustrating a method for displaying an image on a display when an external object exists within a field of view (FOV) of an electronic device according to an embodiment.

FIG. 5 is a flowchart illustrating a method for displaying an image on the display 231 when an external object exists within a field of view (FOV) of the electronic device 200 according to an embodiment. The method to be described in FIG. 5 may be executed by the electronic device 200 or the processor 220 shown in FIG. 2.

According to an embodiment, in operation 510, the processor 220 may obtain FOV information of the electronic device 200 through the sensor 210 and determine whether an external object exists within the FOV of the electronic device 200. When the external object exists within the FOV of the electronic device 200, it may be a situation in which a user must recognize the reality quickly because the external object has appeared in front of the user or may be a situation in which the user has recognized the external object through an indicator displayed on the display 231 and has turned his/her gaze toward the external object.

According to an embodiment, in operation 520, when the external object exists within the FOV of the electronic device 200, the processor 220 may control the display 231 to remove at least one of an indicator, at least one augmented reality object, or at least one virtual reality object.

According to an embodiment, when an external object suddenly appears in front of a user, a user needs to quickly recognize and avoid the external object located in front of the user, and therefore, the electronic device 200 may remove all augmented reality objects or virtual reality objects and indicators displayed on the display 231 to allow the user to focus on reality.

According to an embodiment, when the user recognizes the external object through the indicator and turns his/her gaze toward the external object, the user needs to accurately recognize and avoid the external object, and therefore, the electronic device 200 may remove all augmented reality objects or virtual reality objects and indicators displayed on the display 231.

According to an embodiment, in operation 530, the processor 220 may determine that the importance of the external object has transitioned from being equal to or greater than the second importance to being less than the second importance. When the importance of the external object transitions to being less than the second importance, the user may not need to quickly recognize reality or avoid the external object.

According to an embodiment, in operation 540, when the importance of the external object is less than the second importance, the processor 220 may display the indicator removed in operation 520 on the display 231 again and display the augmented reality object or virtual reality object removed in operation 520 on the display 231 again.

According to an embodiment, in operation 540, the processor 220 may control the display 231 to display a pop-up window for choosing whether to display the augmented reality object or the virtual reality object again in the first area. The user may choose to be provided again with the removed augmented reality object or virtual reality object, or may choose not to be provided with the augmented reality object or virtual reality object in order to focus on the external object located in front.

According to an embodiment, when the importance of the external object transitions from being equal to or greater than the second importance to being less than the second importance, it may be considered that the user has escaped from a situation in which the user has to focus on the external object, and therefore, the display 231 may be controlled to display the indicator and the augmented reality object or the virtual reality object again as in operation 540.

Figure 6:
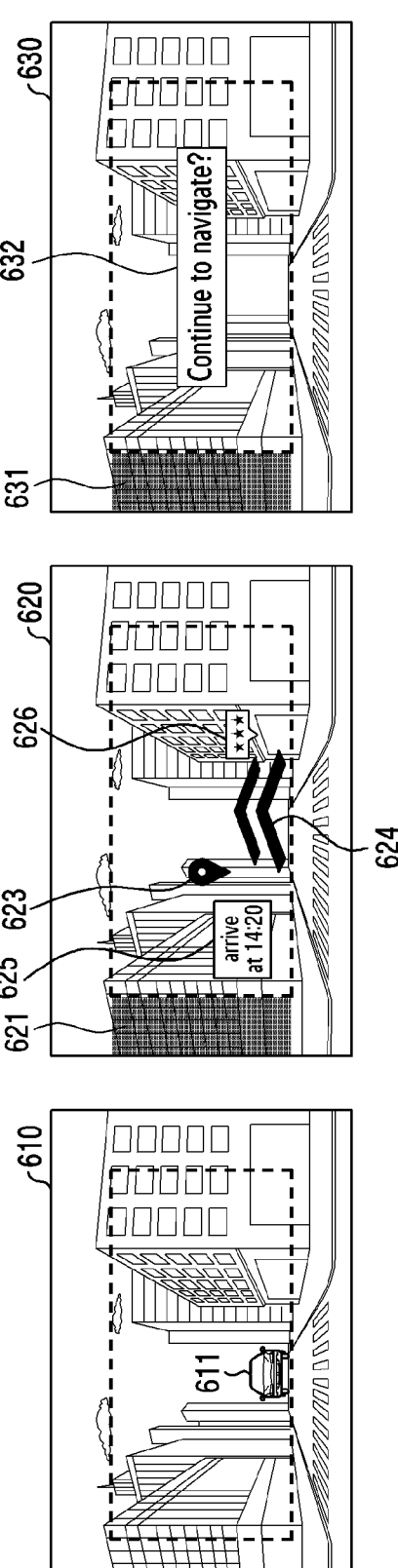
FIG. 6 illustrates examples of screens displayed on a display when an external object exists within the FOV of an electronic device according to an embodiment.

FIG. 6 illustrates examples of screens displayed on the display 231 when an external object exists within the FOV of the electronic device 200 according to an embodiment. In an embodiment, the external object may be a car 611.

According to an embodiment, reference number 610 is an example of a screen displayed on the display 231 when the vehicle 611 exists within the FOV of the electronic device 200.

According to an embodiment, when the car 611 suddenly appears in front of the user, the user needs to quickly recognize reality and avoid the car 611, and therefore, the processor 220 may control the display 231 to remove an augmented reality object or the virtual reality object and the indicator from the first area. For example, the processor 220 may control the display 231 to remove the augmented reality object including destination information, movement direction information, time information indicating an arrival time, and information on nearby shops from the first area and may control the display 231 to remove the indicator being displayed in the first size or the second size.

According to an embodiment, in case the processor 220 displays an indicator on the display 231 due to the car 611 located around the electronic device 200 and the user recognizes the presence of the car 611 while seeing the indicator displayed on the display 231 and turns his/her gaze toward the car 611, the user needs to accurately recognize the car 611 to avoid the car 611, and therefore, the processor 220 may remove the augmented reality object or virtual reality objects and the indicator from the display 231.

According to an embodiment, reference number 620 is an example of a screen displayed on the display 231 when the importance of the car 611 transitions from being equal to or greater than the second importance to being of less than the second importance.

According to an embodiment, the processor 220 may control the display 231 such that the augmented reality object is displayed again in the first area and the indicator 621 is displayed again in the second area. For example, the processor 220 may control the display 231 to display the augmented reality object including destination information 623, movement direction information 624, time information indicating an arrival time 625, and information on nearby shops 626 again in the first area, and may control the display 231 to display the indicator 621 again in the second area.

According to an embodiment, the processor 220 may reacquire information on the external object through the sensor 210, redetermine the importance of the external object, and control the display 231 to display the indicator 621 in the second area. For example, the processor 220 may control the display 231 to display the indicator 621 in the second area to be the first size when determining that the importance of the car 611 is equal to or greater than the first importance and less than the second importance.

According to an embodiment, the indicator 621 may be the indicator 621 which is displayed on the display 231 when the processor 220 recognizes an external object other than the car 611. For example, although the processor 220 does not display an indicator on the display 231 when determining that the importance of the car 611 is less than the first importance, the processor 220 may control the display 231 to display the indicator 621 having the first size in the second area when determining that the importance of other external objects is equal to or greater than the first importance and less than the second importance.

According to an embodiment, reference number 630 is another example of a screen displayed on the display 231 when the importance of the car 611 transitions from being equal to or greater than the second importance to being less than the second importance.

According to an embodiment, the processor 220 may control the display 231 such that the indicator 631 is displayed again in the second area and a pop-up window 632 enabling the user to select whether to display the augmented reality object again is displayed in the first area. With respect to the pop-up window 632, the user may choose to display the augmented reality object in the first area again or choose not to display the augmented reality object in the first area again.

FIG. 7 is a flowchart illustrating a method for displaying an image on the display 231 when an external object is located behind the electronic device 200 according to an embodiment. The method to be described in FIG. 7 may be executed by the electronic device 200 or the processor 220 shown in FIG. 2.

According to an embodiment, in operation 710, the processor 220 may obtain location information and speed information of an external object and speed information of the electronic device 200 through the visual sensor 211, the audio sensor 212, and the acceleration sensor 213, and may obtain relative direction information on the external object located with respect to the electronic device 200.

According to an embodiment, in operation 720, the processor 220 may calculate the relative location and relative speed of the external object with respect to the electronic device 200 through the location information and speed information of the external object and the speed information of the electronic device 200, and may determine the importance of the external object through the relative location and relative speed information.

According to an embodiment, in operation 730, when an external object is located behind the electronic device 200, the processor 220 may control the display 231 to display a captured rear image on the upper end part of the second area.

According to an embodiment, the user may intuitively recognize the external object approaching from behind through the rear image displayed on the upper end part of the second area.

Figure 8:
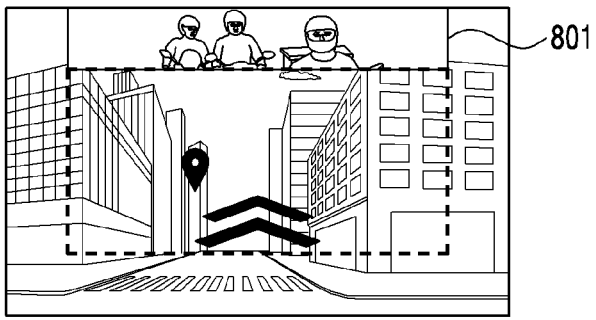
FIG. 8 illustrates an example of a screen displayed on a display when an external object is located behind an electronic device according to an embodiment.

FIG. 8 illustrates an example of a screen displayed on the display 231 when an external object is located behind the electronic device 200 according to an embodiment.

According to an embodiment, the external object may be a motorcycle, and it may be a situation in which the motorcycle is approaching the user from behind.

According to an embodiment, the processor 220 may obtain location information and speed information of the motorcycle through the sensor 210, obtain speed information of the electronic device 200, and obtain the relative direction information on the motorcycle located with respect to the electronic device 200.

According to an embodiment, the processor 220 may determine the importance of the motorcycle by using the location information and speed information of the motorcycle and the speed information of the electronic device 200. For example, when a motorcycle is approaching the user at a speed of 70 km/h at a location 3 m away from the electronic device 200, the processor 220 may determine that the importance of the motorcycle is equal to or greater than the second importance.

According to an embodiment, in consideration of the motorcycle located behind the electronic device 200, the processor 220 may control the display 231 such that an image 801 including the motorcycle approaching from behind is displayed on the upper end part of the second area. The image may be an image acquired through the visual sensor 211 located at the rear of the electronic device 200.

According to an embodiment, the user may recognize that an external object is approaching from behind through the captured rear image 801 displayed on the display 231. The electronic device 200 may provide the captured rear image 801 through the display 231, thereby helping the user intuitively recognize a situation occurring behind. The user may recognize that the motorcycle is approaching from behind and avoid the motorcycle.

Figure 9:
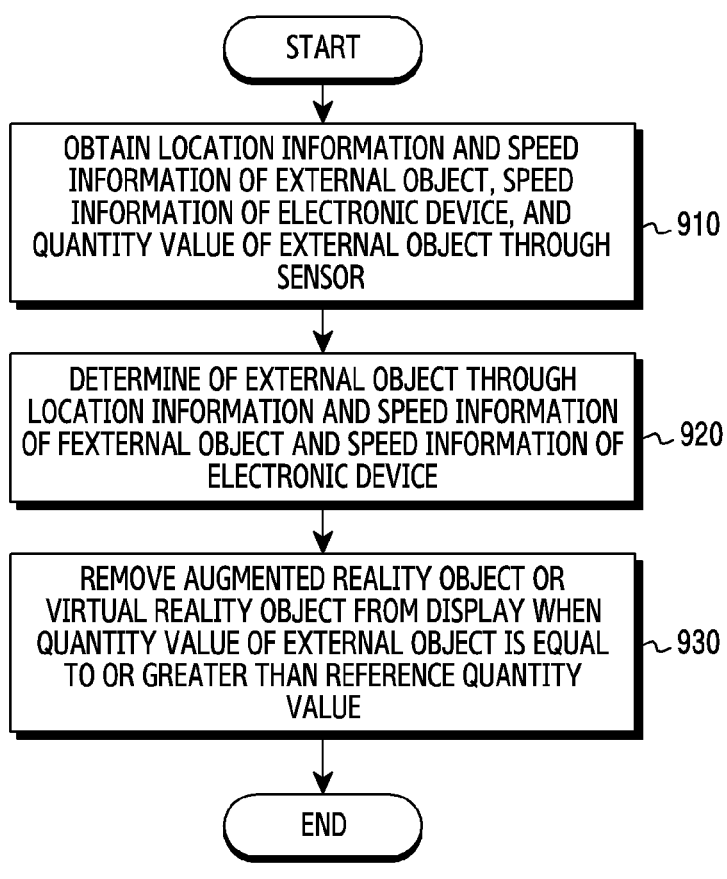
FIG. 9 is a flowchart illustrating a method for displaying an image on a display when a quantity value of an external object is equal to or greater than a reference quantity value according to an embodiment.

FIG. 9 is a flowchart illustrating a method for displaying an image on a display 231 when the quantity value of an external object is equal to or greater than the reference quantity value according to an embodiment. The method to be described in FIG. 9 may be executed by the electronic device 200 or the processor 220 shown in FIG. 2.

According to an embodiment, in operation 910, the processor 220 may obtain location information and speed information of an external object and speed information of the electronic device 200 through the visual sensor 211, the audio sensor 212, and the acceleration sensor 213 and may obtain the quantity value representing the quantity of an external object.

According to an embodiment, in operation 920, the processor 220 may determine the relative location and relative speed of the external object with respect to the electronic device 200 through the location information and speed information of the external object and the speed information of the electronic device 200, and may determine the importance of the external object through information on the relative location and relative speed.

According to an embodiment, in operation 930, the processor 220 may remove at least one augmented reality object or at least one virtual reality object from the display 231 when the quantity value of the external object is equal to or greater than the reference quantity value.

According to an embodiment, when a plurality of external objects exist around the electronic device 200, the processor 220 may remove at least one augmented reality object or at least one virtual reality object from the display 213 to allow the user to focus on the real world without being disturbed by the augmented reality object or virtual reality object displayed on the display 231.

According to an embodiment, the processor 220 may control the display 231 such that the indicator is not removed from the display 231 while at least one augmented reality object or at least one virtual reality object is removed therefrom. For example, the processor 220 may control the display 231 not to display the augmented reality object or virtual reality object in the first area, and may control the display 231 to display an indicator corresponding to the number of external objects in the second area. For another example, the processor 220 may control the display 231 not to display the augmented reality object or the virtual reality object in the first area, and control the display 231 to display an indicator having the second size and displayed over at least a part of the first area and at least a part of the second area and an indicator having the first size and displayed only in the second area.

According to an embodiment, since the user receives only indicators corresponding to external objects from the electronic device 200 and does not receive augmented reality objects or virtual reality objects, the user may focus on a reality in which a plurality of external objects exist around the user.

Figure 10:
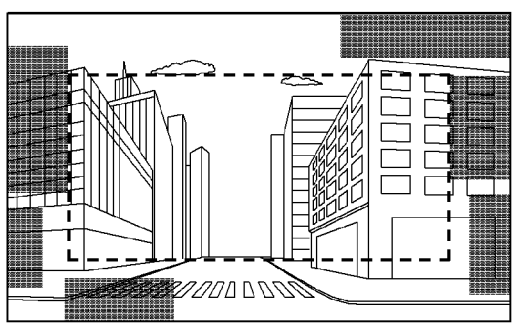
FIG. 10 illustrates an example of a screen displayed on a display when a quantity value of an external object is equal to or greater than a reference quantity value according to an embodiment.

FIG. 10 illustrates an example of a screen displayed on the display 231 when the quantity value of an external object is equal to or greater than the reference quantity value according to an embodiment.

According to an embodiment, when six external objects exist around the electronic device 200, the processor 220 may obtain location information and speed information of the external objects through the sensor 210, obtain speed information of the electronic device 200, and obtain a quantity value representing the quantity of an external object. For example, the processor 220 may obtain information indicating that the quantity value of the external object is 6.

According to an embodiment, the processor 220 may determine the importance of each of the external objects by using the location information and speed information of the external object and the speed information of the electronic device 200. For example, the processor 220 may determine that the importance of each external object is equal to or greater than the first importance and less than the second importance.

According to an embodiment, the processor 220 may determine whether the quantity value of the external object is equal to or greater than a reference quantity value. For example, the reference quantity value may be 5. When the quantity value of the external object is 6 and the reference quantity value is 5, the processor 220 may determine that the quantity value of the external object is equal to or greater than the reference quantity value.

According to an embodiment, the processor 220 may control the display 231 to remove augmented reality objects from the first area. The processor 220 may control the display 231 to display six indicators in the second area in response to the external objects having the importance which is equal to or greater than the first importance and less than the second importance. The processor 220 may control the display 231 to display the indicators in different sizes and directions in the second area.

Figure 11:
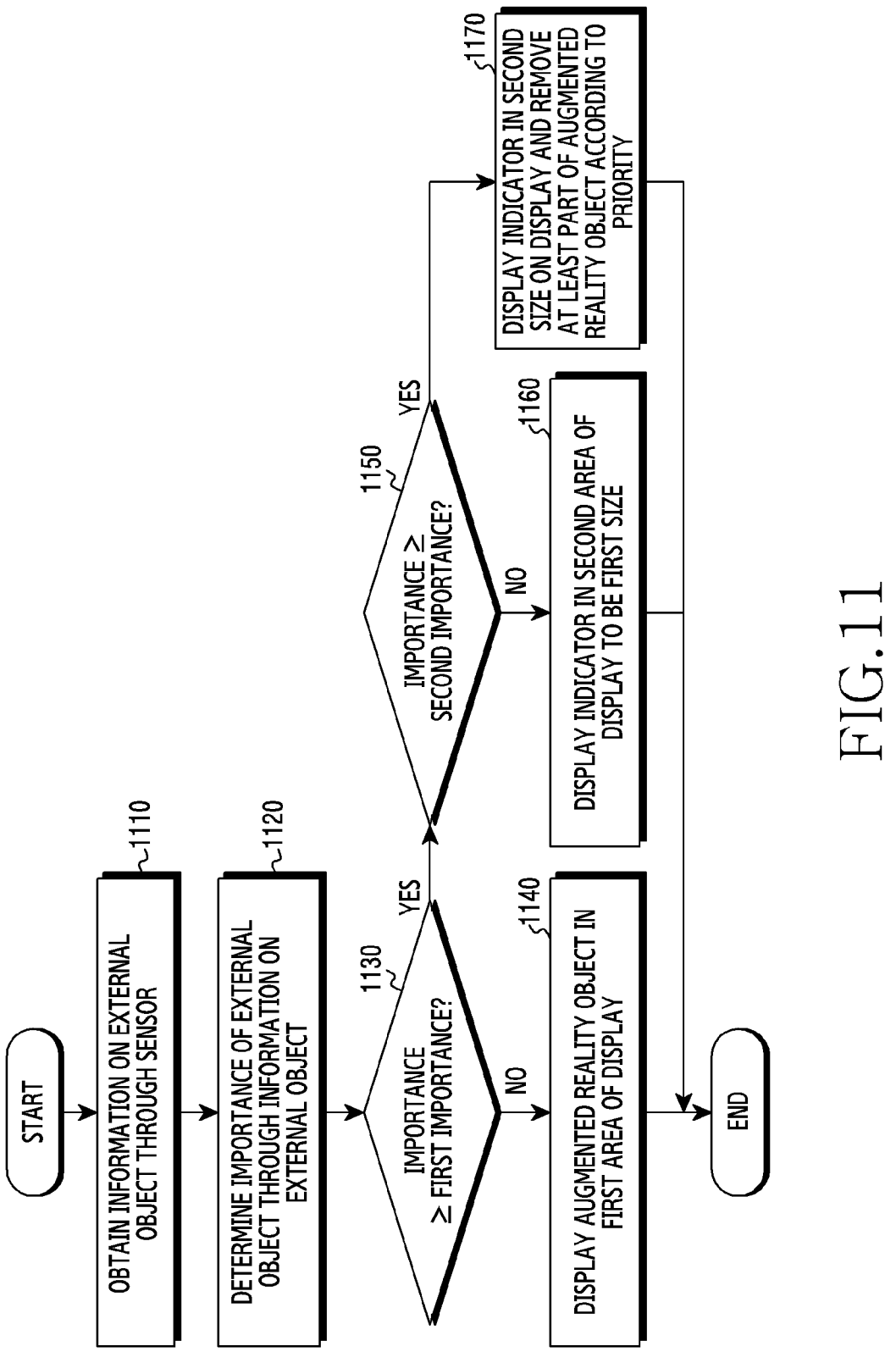
FIG. 11 is a flowchart illustrating a method for displaying an image on a display according to the importance of an external object by an electronic device displaying a virtual reality (VR) object, according to an embodiment.

FIG. 11 is a flowchart illustrating a method for displaying an image on the display 231 according to the importance of an external object by the electronic device 200 displaying a virtual reality (VR) object, according to an embodiment. Since FIG. 11 is a method for applying the method described in FIG. 3 to a virtual reality device, a description a description overlapping with FIG. 3 will be omitted. According to an embodiment, operations 1110, 1120, 1130, and 1150 may correspond to operations 310, 320, 330, and 350 shown in FIG. 3.

According to an embodiment, the processor 220 may determine the importance of an external object by using information on the external object acquired through the sensor 210. A user needs to recognize an external object located around the user even when using a virtual reality device, and therefore, the method described in FIG. 3 may be applied.

According to an embodiment, in operation 1140, when the importance of the external object is less than the first importance, the processor 220 may control the display 231 to display at least one virtual reality object in the first area. Even when information on the external object is not obtained, the processor 220 may control the display 231 to display at least one virtual reality object in the first area. At this time, the processor 220 may control the display 231 not to display the virtual reality object in the second area.

According to an embodiment, in operation 1160, when the importance of the external object is equal to or greater than the first importance and less than the second importance, the processor 220 may control the display 231 to display an indicator in the second area to be a first size. A user may recognize that an external object exists in the vicinity through the indicator displayed in the second area.

According to an embodiment, in operation 1170, when the importance of the external object is equal to or greater than the second importance, the processor 220 may display the indicator on the display 231 in a second size greater than the first size and remove at least a part of the at least one virtual reality object according to priority. The user may recognize the external object through the indicator displayed in the second size on the display 231 and may avoid the external object or stop using the virtual reality device.

Figure 12:
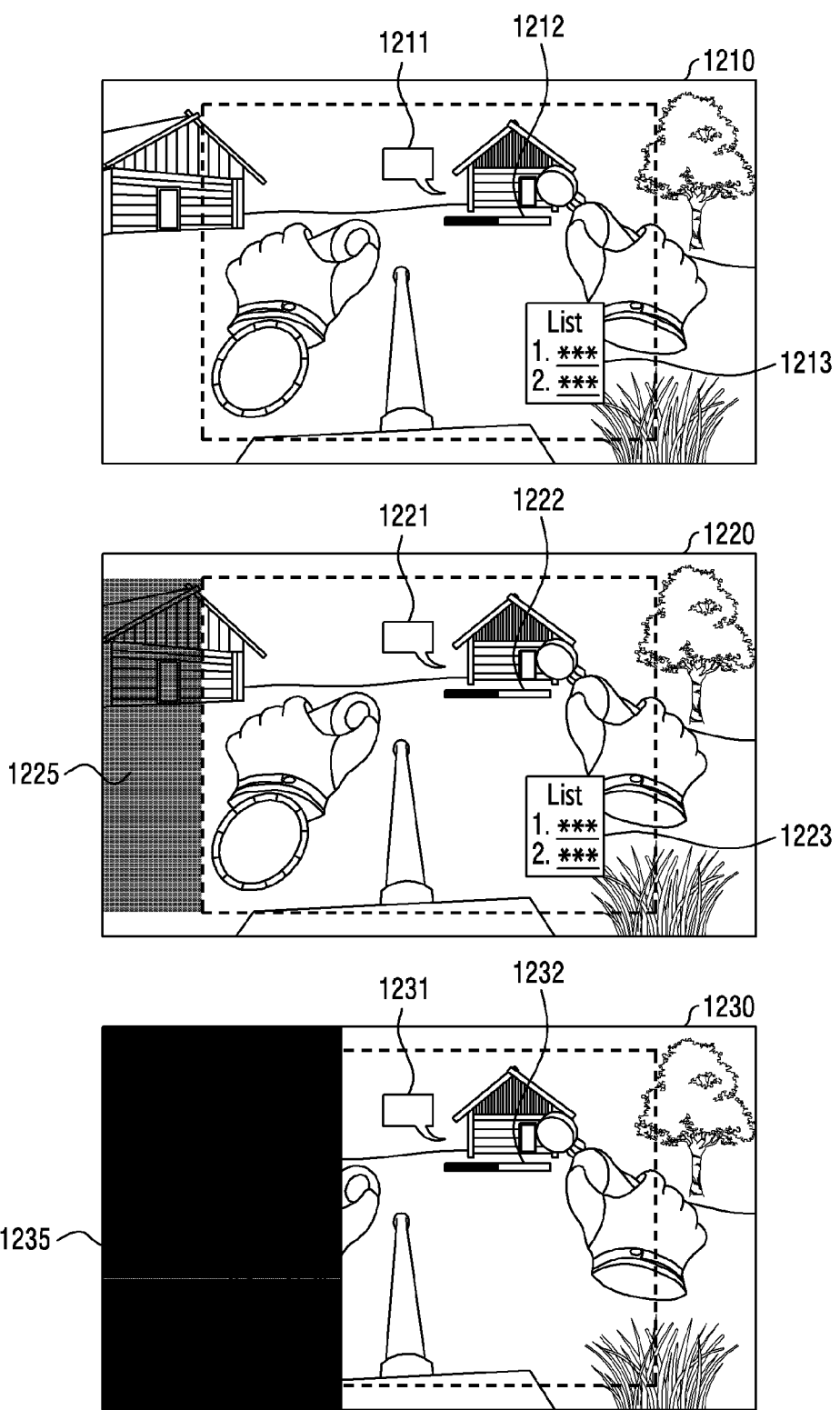
FIG. 12 illustrates examples of screens displayed on a display according to the importance of external objects by an electronic device displaying a virtual reality object according to an embodiment.

FIG. 12 illustrates an example of a screen displayed on the display 231 according to the importance of an external object by the electronic device 200 displaying a virtual reality object according to an embodiment.

According to an embodiment, reference number 1210 is an example of a screen displayed on the display 231 when the importance of an external object is less than the first importance or information on the external object is not acquired. The processor 220 may control the display 231 to display the virtual reality object in the first area. For example, when a game application is executed through a VR device, the processor 220 may control the display 231 to display a virtual reality object including target information 1211, gauge information 1212, and information on a list to be processed 1213 in the first area.

According to an embodiment, reference number 1220 is an example of a screen displayed on the display 231 when the importance of the external object is equal to or greater than the first importance and less than the second importance. The processor 220 may control the display 231 to continuously display the virtual reality object in the first area, and control the display 231 to display the indicator 1225 in the second area. For example, the processor 220 may control the display 231 to display a virtual reality object including target information 1221, gauge information 1222, and information on a list to be processed 1223 in the first area and may control the display 231 to display the indicator 1225 having the first size in the second area. When an external object approaches from the left side of the electronic device 200, the display 231 may be controlled to display the indicator 1225 on the left side of the second area.

According to an embodiment, reference number 1230 is an example of a screen displayed on the display 231 when the importance of the external object is equal to or greater than the second importance. The processor 220 may display an indicator 1235 having the second size on the display 231 and may remove at least a part of at least one virtual reality object from the first area according to priority. For example, the processor 220 may control the display 231 to continuously display the virtual reality object including target information 1231 and gauge information 1232 in the first area and remove the virtual reality object including information on a list to be processed 1223. The processor 220 may display the indicator 1235 having the second size on the display 231. The processor 220 may control the display 231 to display the indicator 1235 having the second size over at least a part of the first area and at least a part of the second area.

Figure 13:
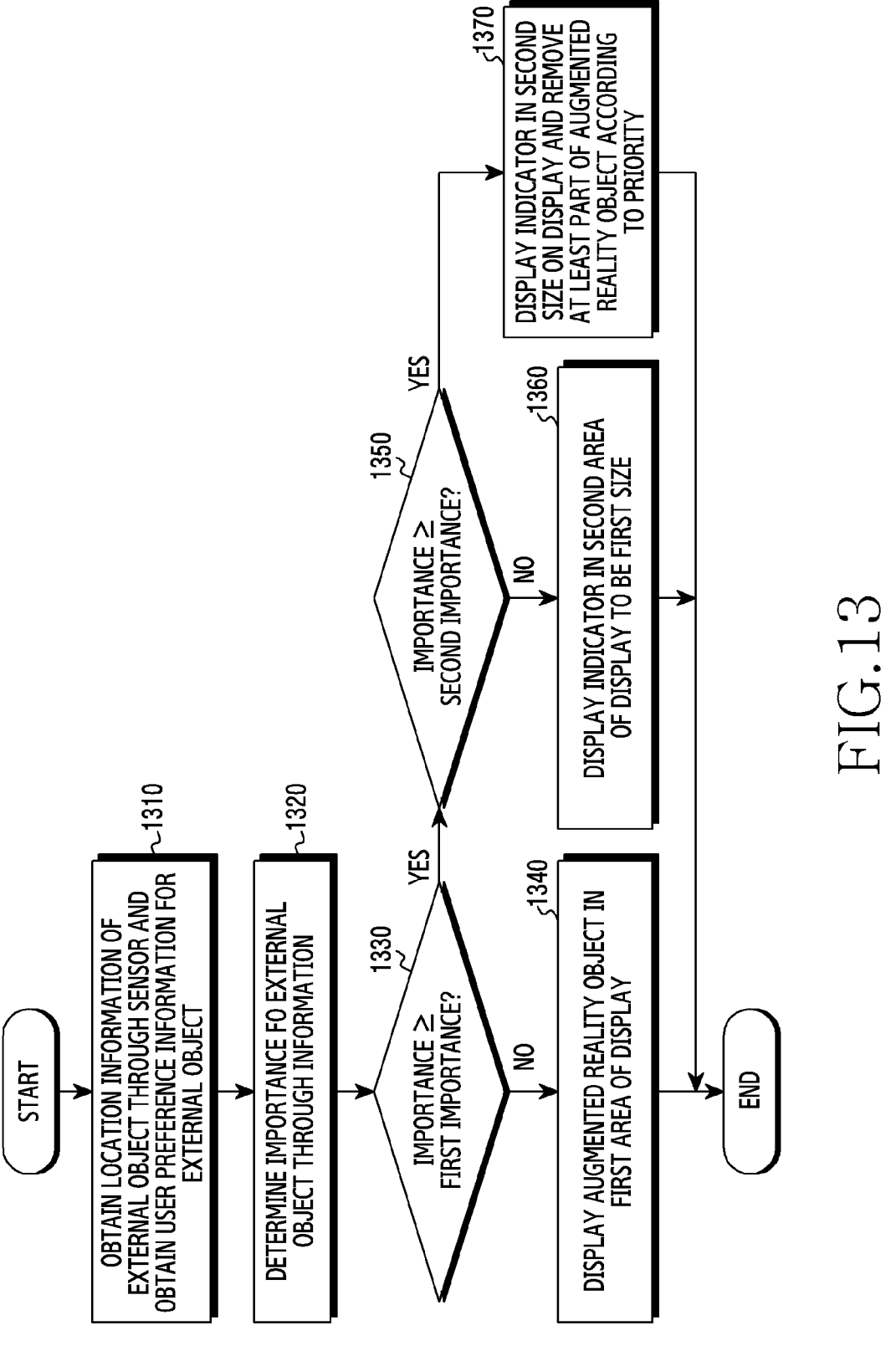
FIG. 13 is a flowchart illustrating a method for displaying user preference on a display according to an embodiment.

FIG. 13 is a flowchart illustrating a method for displaying user preference on the display 231 according to an embodiment. The method to be described in FIG. 13 may be executed by the electronic device 200 or the processor 220 shown in FIG. 2.

According to an embodiment, in operation 1310, the processor 220 may obtain location information of an external object through the sensor 210 and obtain user preference information for the external object. The user preference information for external objects may be preference information configured in advance by a user for external objects or preference information defined by the electronic device 200 based on the access frequency of a user to external objects. For example, when a user visits a game store of a specific brand more than a reference frequency, the electronic device 200 may define that the user preference for the corresponding game store is equal to or greater than the reference value.

According to an embodiment, in operation 1320, the processor 220 may determine the importance of the external object, based on the location information of the external object and the user preference information for the external object. For example, when the game store of the specific brand is located within 10 m from the electronic device 200 and the user preference for the game store is greater than or equal to the reference value, the processor 220 may determine that the importance of the game store is equal to or greater than the second importance.

According to an embodiment, in operation 1330, the processor 220 may determine whether the importance of the external object is equal to or greater than the first importance.

According to an embodiment, in operation 1340, the processor 220 may control the display 231 to display at least one augmented reality object in the first area in response to the importance of the external object which is less than the first importance. The processor 220 may control the display 231 to display at least one augmented reality object in the first area even when information on the external object is not acquired. Types of augmented reality objects may vary as described in FIG. 3. The processor 220 may control the display 231 not to display the augmented reality object in the second area.

According to an embodiment, in operation 1350, the processor 220 may determine whether the importance of the external object which is equal to or greater than the first importance is equal to or greater than the second importance.

According to an embodiment, in operation 1360, the processor 220 may control the display 231 to display an indicator in the second area to be a first size in response to the importance of the external object which is equal to or greater than the first importance and less than the second importance.

According to an embodiment, the processor 220 may control the display 231 to display an indicator in a direction corresponding to an external object having the importance which is equal to or greater than the first importance and less than the second importance. The color and brightness of the indicator may vary. When an external object (e.g., a motorcycle) approaches, the processor 220 may display, on the display 231, an indicator having a color different from that of the indicator displayed on the display 231. For example, when a motorcycle approaches the user from the left, the processor 220 may control the display 231 to display a red indicator on the left side of the second area, and when a game store of a specific brand with high user preference is displayed on the right side, the display 231 may be controlled to display a green indicator on the right side of the second area.

According to an embodiment, the processor 220 may control the display 231 to continuously display at least one augmented reality object in the first area while displaying the indicator in the second area to be the first size.

According to an embodiment, in operation 1370, the processor 220 may control the display 231 such that, in response to the importance of the external object which is equal to or greater than the second importance, the indicator is displayed in a second size greater than the first size and at least a part of at least one augmented reality object is removed from the first area according to priority.

According to an embodiment, the processor 220 may control the display 231 such that at least a part of the indicator displayed in the second size is displayed in at least a part of the first area.

According to an embodiment, the processor 220 may control the display 231 such that the indicator is translucently displayed while overlapping at least one augmented reality object displayed in the first area.

According to an embodiment, the priority of the at least one augmented reality object displayed in the first area may be a priority configured in advance in an application providing an augmented reality object or a priority configured by a user.

Figure 14:
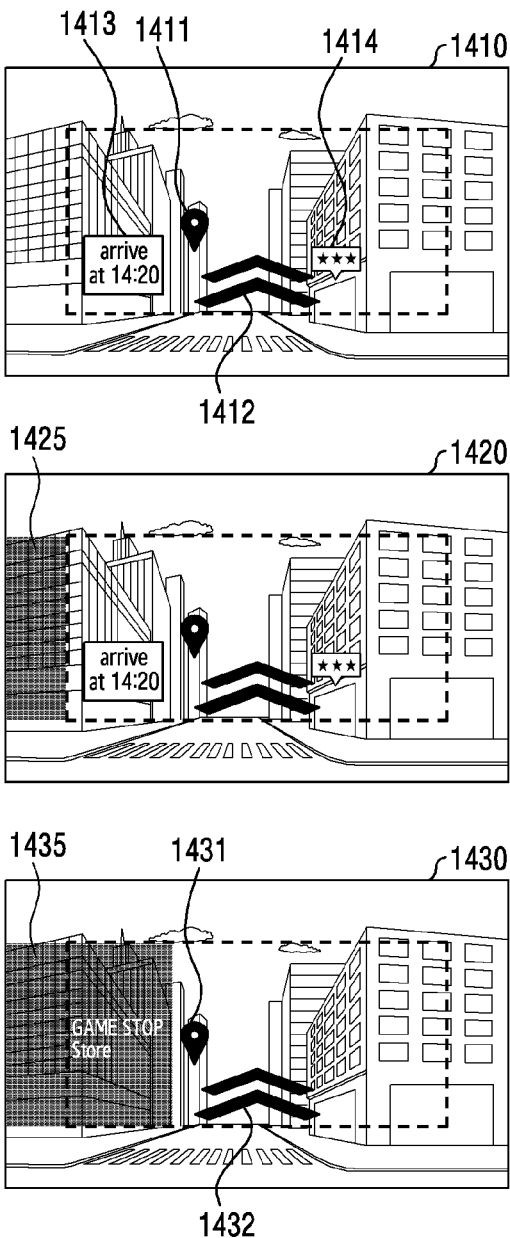
FIG. 14 illustrates examples of screens displayed on a display according to user preference according to an embodiment.

FIG. 14 illustrates examples of screens displayed on the display 231 according to user preference according to an embodiment.

According to an embodiment, it may be a situation in which a user passes near a "GAME STOP store" while using the electronic device 200 providing an augmented reality object after configuring the preference value for the "GAME STOP store" in the electronic device 200 to be equal to or greater than the reference value.

According to an embodiment, reference number 1410 is an example of a screen displayed on the display 231 when the importance of the external object is less than the first importance or information on the external object is not acquired. The processor 220 may control the display 231 to display at least one augmented reality object in the first area. For example, the processor 220 may control the display 231 to display an augmented reality object including destination information 1411, movement direction information 1412, time information indicating an arrival time 1413, and information on nearby shops 1414 in the first area.

According to an embodiment, reference number 1420 is an example of a screen displayed on the display 231 when the importance of the external object is equal to or greater than the first importance and less than the second importance. The processor 220 may control the display 231 to continuously display the augmented reality object in the first area and control the display 231 to display the indicator 1425 in the second area. For example, when "GAME STOP store" is located around the user, the processor 220 may determine that the importance of the "GAME STOP store" is equal to or greater than the first importance and less than the second importance. The processor 220 may control the display 231 to display an augmented reality object including destination information, movement direction information, time information indicating an arrival time, and information on nearby shops in the first area, and control the display 231 such that an indicator 1425 indicating that the "GAME STOP store" is located is displayed in the second area.

According to an embodiment, reference number 1430 is an example of a screen displayed on the display 231 when the importance of the external object is equal to or greater than the second importance. The processor 220 may display the indicator 1435 having the second size on the display 231 and remove at least a part of the augmented reality objects from the first area according to priority. For example, the processor 220 may determine that the importance of the "GAME STOP store" is equal to or greater than the second importance. The processor 220 may display the indicator 1435 having the second size on the display 231. The processor 220 may control the display 231 to display the indicator 1435 having the second size over at least a part of the first area and at least a part of the second area. The processor 220 may control the display 231 to continuously display the augmented reality object including destination information 1431 and movement direction information 1432 in the first area, and control the display 231 such that the augmented reality object including time information indicating an arrival time 1413 and information on nearby shops 1414 is removed due to the low priority thereof.

Figure 15:
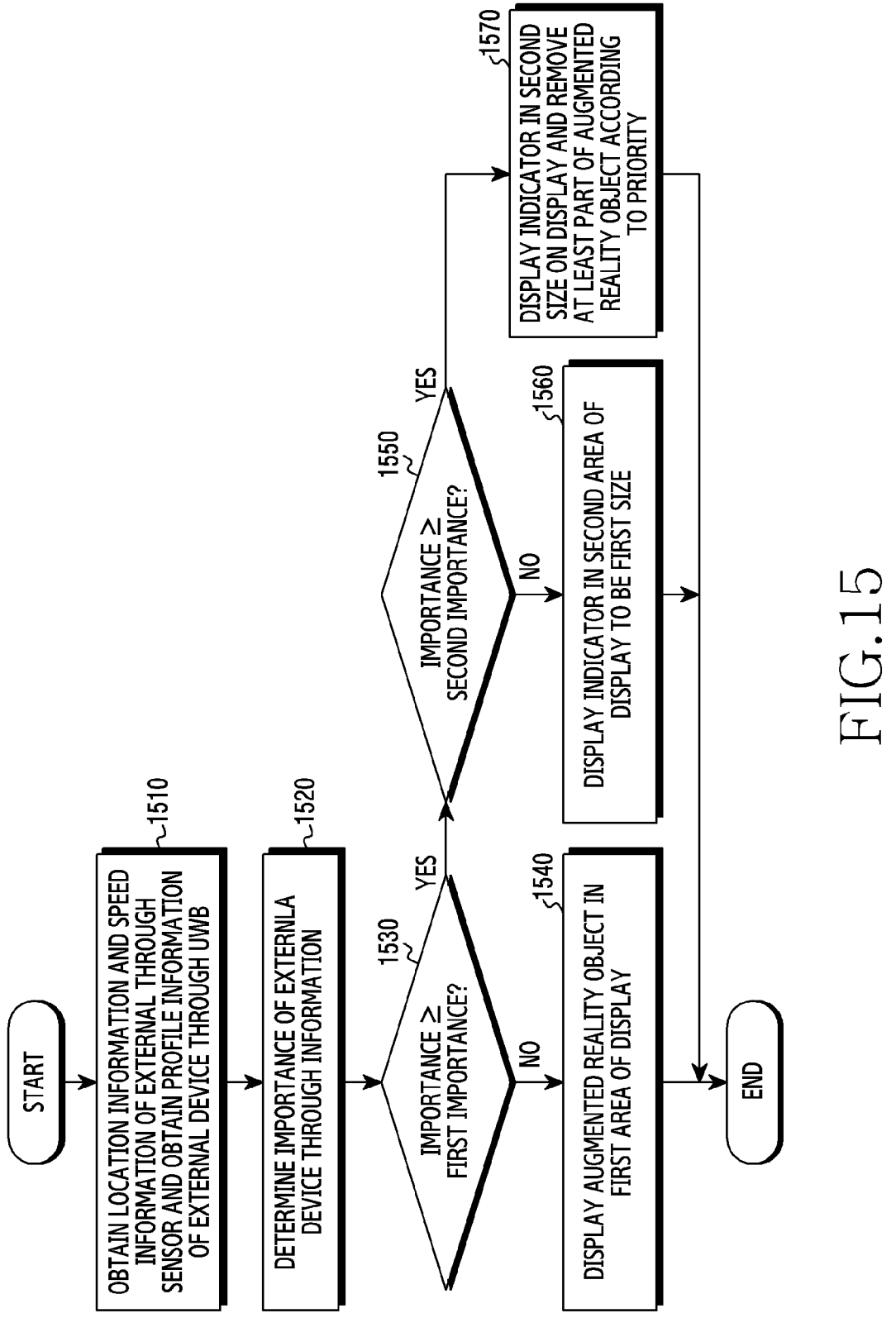
FIG. 15 is a flowchart illustrating a method for obtaining profile information of an external device and displaying the profile information on a display according to an embodiment.

FIG. 15 is a flowchart illustrating a method for obtaining profile information of an external device and displaying the profile information on the display 231 according to an embodiment. The method to be described in FIG. 15 may be executed by the electronic device 200 or the processor 220 shown in FIG. 2.

According to an embodiment, in operation 1510, the processor 220 may obtain location information and speed information of the external device through the sensor 210 and obtain profile information of the external device through UWB. The profile information of the external device may correspond to the user's SNS information or previously stored information on the external device. For example, when an external device stored as "Samsung employee Kim XX" in the electronic device 200 by the user is located nearby, the processor 220 may obtain profile information of the external device.

According to an embodiment, in operation 1520, the processor 220 may determine the importance of the external device through at least one of location information and speed information of the external device or profile information of the external device registered in the electronic device or user account. For example, when information in which an external device stored as "Samsung employee Kim XX" is located within 3 m from the electronic device 200 and moves toward the electronic device 200 at a speed of 5 km/h is obtained, the processor 220 may determine that the importance of the external device is equal to or greater than the second importance.

According to an embodiment, in operation 1530, the processor 220 may determine whether the importance of the external device is equal to or greater than the first importance.

According to an embodiment, in operation 1540, the processor 220 may control the display 231 to display at least one augmented reality object in the first area in response to the importance of the external device which is less than the first importance. The processor 220 may control the display 231 to display at least one augmented reality object in the first area even when information on the external device is not obtained. Types of augmented reality objects may vary as described in FIG. 3. The processor 220 may control the display 231 not to display the augmented reality object in the second area.

According to an embodiment, in operation 1550, the processor 220 may determine whether the importance of the external device which is equal to or greater than the first importance is equal to or greater than the second importance.

According to an embodiment, in operation 1560, the processor 220 may control the display 231 to display an indicator in the second area to be a first size in response to the importance of the external device which is equal to or greater than the first importance and less than the second importance.

According to an embodiment, the processor 220 may control the display 231 to display an indicator in a direction corresponding to an external device having the importance which is equal to or greater than the first importance and less than the second importance. The color and brightness of the indicator may vary. When an external object (e.g., a motorcycle) approaches, the processor 220 may display, on the display 231, an indicator having a color different from those of an indicator displayed on the display 231 and an indicator according to user preference information. For example, when a motorcycle approaches from the user's left side, the processor 220 may control the display 231 to display a red indicator on the left side of the second area, and when the external device having the importance which is equal to or greater than the first importance and less than the second importance is located on the right side, the processor may control the display 231 to display a purple indicator on the right side of the second area.

According to an embodiment, the processor 220 may control the display 231 to continuously display at least one augmented reality object in the first area while displaying the indicator in the second area to be the first size.

According to an embodiment, in operation 1570, the processor 220 may control the display 231 such that, in response to determining that the importance of the external device is equal to or greater than the second importance, the indicator is displayed in a second size greater than the first size and at least a part of the augmented reality objects is removed from the first area according to priority.

According to an embodiment, the processor 220 may control the display 231 such that at least a part of the indicator displayed in the second size is displayed in at least a part of the first area.

According to an embodiment, the processor 220 may control the display 231 such that the indicator is translucently displayed while overlapping at least one augmented reality object displayed in the first area.

According to an embodiment, the priority of at least one augmented reality object being displayed in the first area may be a priority configured in advance in an application providing an augmented reality object or a priority configured by a user.

Figure 16:
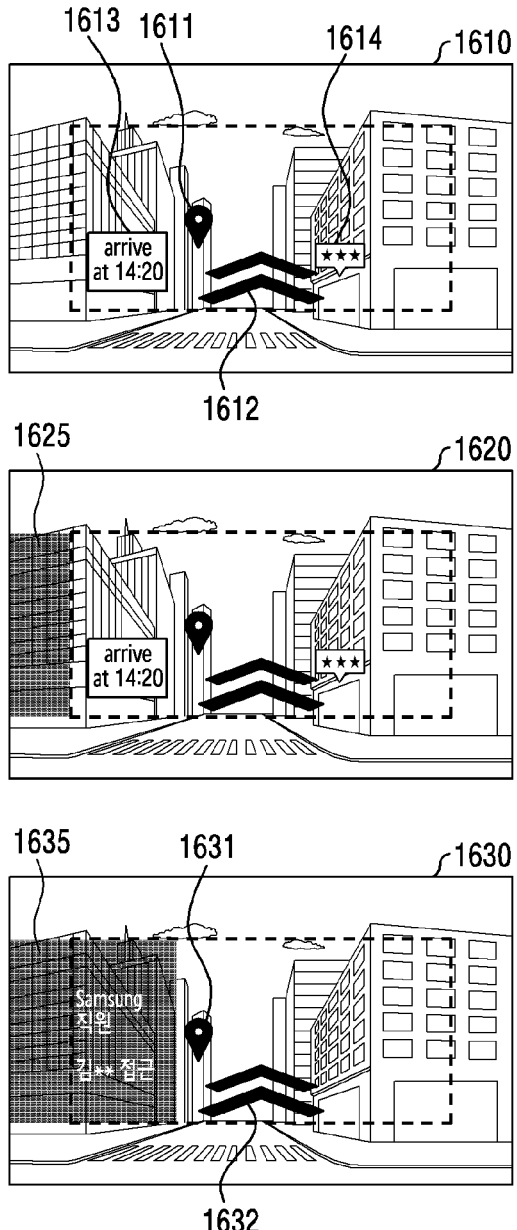
FIG. 16 illustrates examples of screens displayed on a display after acquiring profile information of an external device according to an embodiment.

FIG. 16 illustrates examples of screens displayed on the display 231 after acquiring profile information of an external device according to an embodiment.

According to an embodiment, reference number 1610 is an example of a screen displayed on the display 231 when the importance of the external device is less than the first importance or information on the external device is not obtained. The processor 220 may control the display 231 to display at least one augmented reality object in the first area. For example, the processor 220 may control the display 231 to display an augmented reality object including destination information 1611, movement direction information 1612, time information indicating an arrival time 1613, and information on nearby shops 1614 in the first area.

According to an embodiment, reference number 1620 is an example of a screen displayed on the display 231 when the importance of the external device is equal to or greater than the first importance and less than the second importance. The processor 220 may control the display 231 object to continuously display the augmented reality in the first area and may control the display 231 to display the indicator 1625 in the second area. For example, when an external device stored as "Samsung employee Kim XX" is located near the user, the processor 220 may determine that the importance of the external device is equal to or greater than the first importance and less than the second importance. The processor 220 may control the display 231 to display an augmented reality object including destination information, movement direction information, time information indicating an arrival time, and information on nearby shops in the first area and may control the display 231 such that an indicator 1625 indicating that the external device of "Samsung employee Kim XX" is located is displayed in the second area.

According to an embodiment, reference number 1630 is an example of a screen displayed on the display 231 when the importance of the external device is equal to or greater than the second importance. The processor 220 may control the display 231 such that the indicator 1635 is displayed in the second size and at least a part of the augmented reality object is removed from the first area according to priority. For example, the processor 220 may determine that the importance of the external device of "Samsung employee Kim XX" is equal to or greater than the second importance. The processor 220 may display the indicator 1635 having the second size on the display 231. The processor 220 may control the display 231 to display the indicator 1635 over at least a part of the first area and at least a part of the second area. The processor 220 may control the display 231 to continuously display the augmented reality object including destination information 1631 and movement direction information 1632 in the first area, and may control the display 231 such that the augmented reality object including time information indicating an arrival time 1613 and information on nearby shops 1614 is removed due to the low priority thereof.

Figure 17:
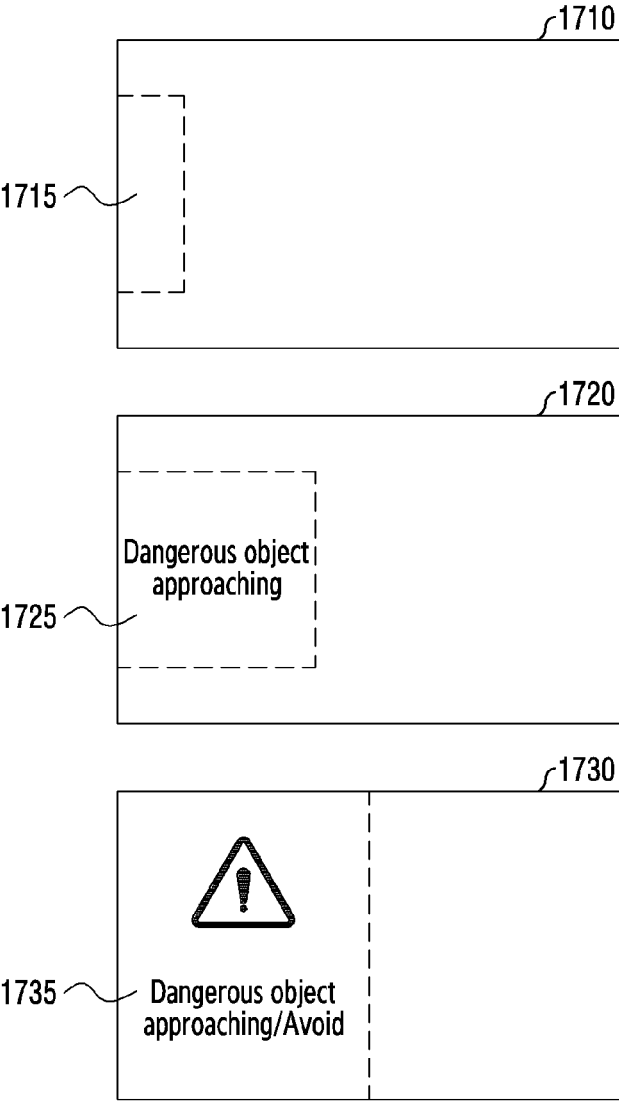
FIG. 17 illustrates examples of indicators displayed on a display according to the importance of an external object according to an embodiment.

FIG. 17 illustrates an example of an indicator displayed on the display 231 according to the importance of an external object according to an embodiment.

According to an embodiment, the external object may be an object dangerous to a user (e.g., a motorcycle or a car approaching a user). In this case, the user needs to recognize and avoid the external object, the electronic device 200 may inform the user of the existence of the external object through the display 231 and provide a warning message. In an embodiment, the processor 220 may additionally output a notification through at least one of the speaker 232 and the haptic module 233 while displaying an indicator on the display 231.

According to an embodiment, reference number 1710 is an example of an indicator displayed on the display 231 when the importance of the external object is equal to or greater than the first importance and less than the second importance. The processor 220 may control the display 231 to display an indicator 1715 having the first size in the second area when the importance of the external object is equal to or greater than the first importance and less than second importance. The indicator 1715 may be in the form of a translucent box and may not include separate words or pictures.

According to an embodiment, reference number 1720 is an example of an indicator displayed on the display 231 when the importance of the external object is equal to or greater than the second importance. The processor 220 may display an indicator 1725 having the second size on the display 231 when the importance of the external object is equal to or greater than the second importance. The processor 220 may control the display 231 to display the indicator 1725 over at least a part of the first area and at least a part of the second area. The indicator 1725 may be in the form of a translucent box, and may have a larger area than the indicator 1715 having the first size. The processor 220 may display the indicator 1725 on the display 231 along with the words "dangerous object approaching".

According to an embodiment, reference number 1730 is an example of a screen displayed on the display 231 when the importance of the external object is equal to or greater than the second importance and has increased more than that of reference number 1720. For example, the processor 220 may determine that a bicycle approaching at a speed of 30 km/h from a location 5 m away from the electronic device 200 has the importance which is equal to or greater than the second importance. In this case, when the bicycle approaches at a speed of 50 km/h from location 1 m away from the electronic device 200, the processor 220 may determine that the importance of the bicycle has increased.

According to an embodiment, when the importance has increased more than that of reference number 1720, the processor 220 may display an indicator 1735 greater than the indicator 1725 having the second size on the display 231. The processor 220 may control the display 231 to display the indicator 1735 in a size corresponding to half of the display area. The processor 220 may display the indicator 1735 on the display 231 together with words "dangerous object approaching" and "'avoid" and an icon indicating danger.

An electronic device according to an embodiment may include a sensor, a display including a first area and a second area, and at least one processor electrically connected to the sensor and the display. The at least one processor may be configured to obtain information on an external object through the sensor, determine the importance of the external object through the information, control the display to display at least one augmented reality object or at least one virtual reality object in the first area in response to at least one of determining that the importance is less than a first importance and that the information on the external object has not been obtained, control the display to display an indicator in the second area to be a first size in response to the importance which is equal to or greater than the first importance and is less than a second importance, and in response to the importance which is equal to or greater than the second importance, display the indicator in a second size greater than the first size and remove at least a part of the at least one augmented reality object or the at least one virtual reality object according to priority.

In the electronic device according to an embodiment, the at least one processor may be configured to control the display such that at least a part of the indicator displayed in the second size is displayed in at least a part of the first area.

In the electronic device according to an embodiment, the first area may be a central area including the center of a display area where a screen is displayed by the display, and the second area may be a peripheral area of the display area surrounding the first area.

In the electronic device according to an embodiment, the information on the external object may include location information and speed information of the external object, and the at least one processor may be configured to obtain speed information of the electronic device through the sensor, and determine the importance of the external object by using at least one of the information on the external object and the information on the electronic device.

In the electronic device according to an embodiment, the at least one processor may be configured to obtain field of view (FOV) information of the electronic device through the sensor, and control the display to remove the at least one augmented reality object or the at least one virtual reality object and the indicator in response to determination that the external object exists within the FOV of the electronic device.

In the electronic device according to an embodiment, the at least one processor may control the display to display the removed at least one augmented reality object or the removed at least one virtual reality object and the removed indicator again in response to a transition of the importance of the external object from being equal to or greater than the second importance to being less than the second importance.

In the electronic device according to an embodiment, the at least one processor may be configured to control the display such that a pop-up window for selecting whether to redisplay the removed at least one augmented reality object or the removed at least one virtual reality object is displayed in the first area.

In the electronic device according to an embodiment, the information on the external object may include relative direction information on the external object located with respect to the electronic device, and the at least one processor may be configured to control the display such that a captured rear image is displayed on an upper end part of the second area when the direction information indicates behind.

In the electronic device according to an embodiment, the information on the external object may include a quantity value representing the quantity of the external object, and the at least one processor may be configured to remove the at least one augmented reality object or the at least one virtual reality object when the quantity value of the external object is equal to or greater than a reference quantity value.

The electronic device according to an embodiment may include at least one of a speaker or a haptic module electrically connected to the at least one processor, and the at least one processor may be configured to output a notification through at least one of the speaker or the haptic module when the importance of the external object is equal to or greater than the first importance.

A method for operating an electronic device according to an embodiment may include acquiring information on an external object through a sensor, determining the importance of the external object through the information, displaying at least one augmented reality object or at least one virtual reality object in a first area of a display in response to at least one of determining that the importance is less than a first importance and that the information on the external object has not been obtained, displaying an indicator in a second area of the display to be a first size in response to the importance which is equal to or greater than the first importance and less than a second importance, and in response to the importance which is equal to or greater than the second importance, displaying the indicator in a second size larger than the first size on the display and removing at least a part of the at least one augmented reality object or the at least one virtual reality object according to priority.

In the method for operating an electronic device according to an embodiment, the displaying of the indicator in the second size on the display may include displaying at least a part of the indicator in at least a part of the first area.

In the method for operating an electronic device according to an embodiment, the first area of the display may be a central area including the center of a display area where a screen is displayed by the display, and the second area may be a peripheral area of the display area surrounding the first area.

In the method for operating an electronic device according to an embodiment, the information on the external object may include location information and speed information of the external object, the obtaining of the information on the external object may include obtaining speed information of the electronic device through the sensor, and the determining of the importance of the external object may include determining the importance by using at least one of the information on the external object and the information on the electronic device.

The method for operating an electronic device according to an embodiment may include obtaining field of view (FOV) information of the electronic device through the sensor, and removing the at least one augmented reality object or the at least one virtual reality object and the indicator from the display in response to determination that the external object exists within the FOV of the electronic device.

The method for operating an electronic device according to an embodiment may include displaying the removed at least one augmented reality object or the removed at least one virtual reality object and the removed indicator again in response to a transition of the importance of the external object from being equal to or greater than the second importance to being less than the second importance.

The method for operating an electronic device according to an embodiment may include displaying a pop-up window for selecting whether to redisplay the removed at least one augmented reality object or the removed at least one virtual reality object in the first area.

In the method for operating an electronic device according to an embodiment, the information on the external object may include relative direction information on the external object located with respect to the electronic device, and the obtaining of the information on the external object may include displaying a captured rear image on an upper end part of the second area when the direction information indicates behind.

In the method for operating an electronic device according to an embodiment, the information on the external object may include a quantity value representing the quantity of the external object, and the obtaining of the information on the external object may include removing the at least one augmented reality object or the at least one virtual reality object from the display when the quantity value of the external object is equal to or greater than a reference quantity value.

The method for operating an electronic device according to an embodiment may include outputting a notification through at least one of a speaker or a haptic module included in the electronic device when the importance of the external object is equal to or greater than the first importance.

Figure 18:
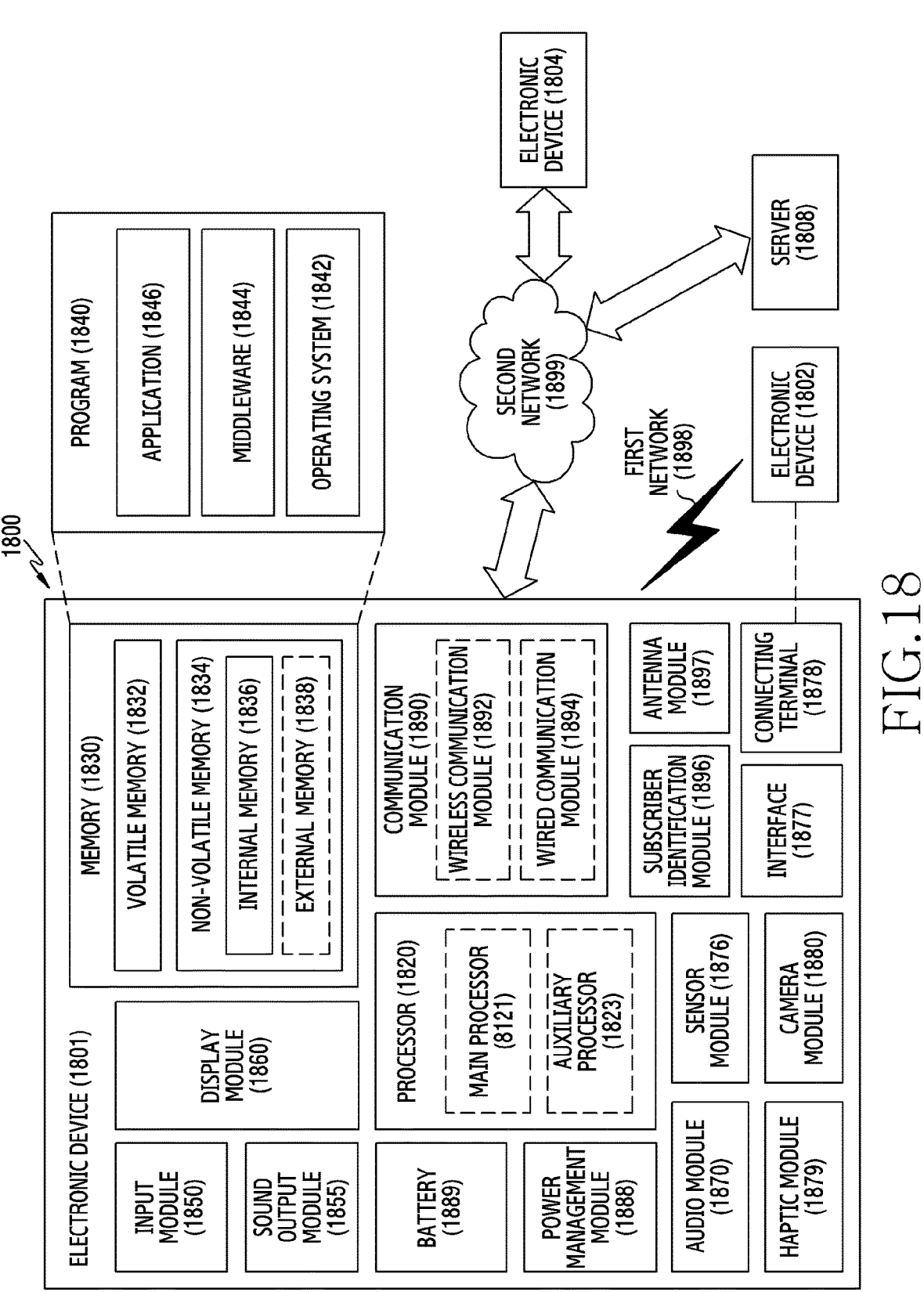
FIG. 18 is a block diagram of an electronic device in a network environment according to various embodiments.

FIG. 18 is a block diagram illustrating an electronic device 1801 in a network environment 1800 according to various embodiments. Referring to FIG. 18, the electronic device 1801 in the network environment 1800 may communicate with an electronic device 1802 via a first network 1898 (e.g., a short-range wireless communication network), or at least one of an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In some embodiments, at least one of the components (e.g., the connecting terminal 1878) may be omitted from the electronic device 1801, or one or more other components may be added in the electronic device 1801. In some embodiments, some of the components (e.g., the sensor module 1876, the camera module 1880, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823. According to an embodiment, the auxiliary processor 1823 (e.g., the neural processing unit) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to an embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mmWave band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to an embodiment, the wireless communication module 1892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

According to various embodiments, the antenna module 1897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or mobile edge computing. In another embodiment, the external electronic device 1804 may include an internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a sensor;
a display comprising a first area that occupies an interior region enclosing a geometrical center of the display and a second area that is a continuous, frame-shaped band completely surrounding, and non-overlapping with, the first area; and
at least one processor electrically connected to the sensor and the display,
wherein the at least one processor is configured to:
obtain information on an external object through the sensor;
determine an importance of the external object based on the information;
control the display to display at least one augmented reality object or at least one virtual reality object in the first area in response to at least one of determining that the importance is less than a first importance and that the information on the external object has not been obtained;
control the display to display an indicator having a first size exclusively in the second area in response to the importance is equal to or greater than the first importance and is less than a second importance; and
in response to the importance being equal to or greater than the second importance, display the indicator having a second size greater than the first size such that at least a part of the indicator is displayed in at least a part of the first area and remove, from the first area, at least a part of the at least one augmented reality object or at least one virtual reality object.

2. The electronic device of claim 1, wherein the at least one processor is configured to control the display such that at least a part of the indicator displayed in the second size is displayed in at least a part of the first area.

3. The electronic device of claim 1, wherein the information on the external object comprises location information and speed information of the external object, and the at least one processor is configured to:

obtain speed information of the electronic device through the sensor; and determine the importance of the external object by using at least one of the information on the external object and the speed information on the electronic devices, wherein the location information and speed information are used to determine when to display the indicator in the second area and when to display at least a part of the indicator in the first area.

4. The electronic device of claim 1, wherein the at least one processor is configured to:

obtain field of view (FOV) information of the electronic device through the sensor; and control the display to remove the at least one augmented reality object or the at least one virtual reality object and the indicator in response to determination that the external object exists within the FOV of the electronic device.

5. The electronic device of claim 4, wherein the at least one processor is configured to control the display to display the removed at least one augmented reality object or the removed at least one virtual reality object and the removed indicator again in response to a transition of the importance of the external object from being equal to or greater than the second importance to being less than the second importance.

6. The electronic device of claim 5, wherein the at least one processor is configured to control the display such that a pop-up window for selecting whether to redisplay the removed at least one augmented reality object or the removed at least one virtual reality object is displayed in the first area.

7. The electronic device of claim 1, wherein the information on the external object comprises relative direction information on the external object located with respect to the electronic device, and the at least one processor is configured to control the display such that a captured rear image is displayed on an upper end part of the second area in case that the direction information indicates behind.

8. The electronic device of claim 1, further comprising:

at least one of a speaker or a haptic module electrically connected to at least one processor, the at least one processor is configured to output a notification through at least one of the speaker and the haptic module when the importance of the external object is equal to or greater than a first importance.

9. An electronic device comprising:

a sensor;

a display comprising a first area and a second area; and at least one processor electrically connected to the sensor and the display, wherein the at least one processor is configured to:

obtain information on an external object through the sensor;

determine an importance of the external object based on the information;

control the display to display at least one augmented reality object or at least one virtual reality object in the first area in response to at least one of determining that the importance is less than a first importance and that the information on the external object has not been obtained;

control the display to display an indicator having a first size in the second area in response to the importance is equal to or greater than the first importance and is less than a second importance; and in response to the importance being equal to or greater than the second importance, display the indicator having a second size greater than the first size and remove at least a part of the at least one augmented reality object or at least one virtual reality object, wherein the information on the external object comprises a quantity value representing the quantity of the external object, and the at least one processor is configured to remove the at least one augmented reality object or the at least one virtual reality object in case that the quantity value of the external object is equal to or greater than a reference quantity value.

10. A method for operating an electronic device, the method comprising:

obtaining information on an external object through a sensor;

determining an importance of the external object based on the information;

displaying at least one augmented reality object or at least one virtual reality object in a first area of a display that occupies an interior region enclosing a geometrical center of the display in response to at least one of determining that the importance is less than a first importance and that the information on the external object has not been obtained;

displaying an indicator having a first size exclusively in a second area of the display that is a continuous, frame-shaped band completely surrounding, and non-overlapping with the first area of the in response to the importance being equal to or greater than the first importance and is less than a second importance; and in response to the importance being equal to or greater than the second importance, displaying the indicator having a second size larger than the first size such that at least a part of the indicator is displayed in at least a part of the first area on the display and removing, from the first area, at least a part of the at least one augmented reality object or at least one virtual reality object.

11. The method of claim 10, wherein the displaying of the indicator in the second size on the display comprises displaying at least a part of the indicator in at least a part of the first area.

12. The method of claim 10, wherein the information on the external object comprises location information and speed information of the external object, the obtaining of the information on the external object comprises obtaining speed information of the electronic device through the sensor, and the determining of the importance of the external object comprises determining the importance by using at least one of the information on the external object and the speed information on the electronic device.

13. The method of claim 10, comprising:

obtaining field of view (FOV) information of the electronic device through the sensor; and removing the at least one augmented reality object or the at least one virtual reality object and the indicator from the display in response to determination that the external object exists within the FOV of the electronic device.

14. The method of claim 13, comprising:
controlling the display to display the removed at least one augmented reality object or the removed at least one virtual reality object and the removed indicator again in response to a transition of the importance of the external object from being equal to or greater than the second importance to being less than the second importance.

15. The method of claim 14, comprising:
controlling the display such that a pop-up window for selecting whether to redisplay the removed at least one augmented reality object or the removed at least one virtual reality object is displayed in the first area.

16. The method of claim 10, wherein the information on the external object comprises relative direction information on the external object located with respect to the electronic device, and the obtaining of the information on the external object comprises displaying a captured rear image on an upper end part of the second area in case that the direction information indicates behind.

17. The method of claim 10, wherein the information on the external object comprises a quantity value representing the quantity of the external object, and
the obtaining of the information on the external object comprises removing the at least one augmented reality object or the at least one virtual reality object from the display in case that the quantity value of the external object is equal to or greater than a reference quantity value.

18. The method of claim 10, comprising:
outputting a notification through at least one of a speaker and a haptic module when the importance of the external object is equal to or greater than a first importance.

\* \* \* \* \*